US010591601B2

(12) United States Patent
Hicks et al.

(10) Patent No.: US 10,591,601 B2
(45) Date of Patent: Mar. 17, 2020

(54) CAMERA-GATED LIDAR SYSTEM

(71) Applicant: Luminar Technologies, Inc., Orlando, FL (US)

(72) Inventors: Richmond Hicks, Oviedo, FL (US); Matthew D. Weed, Winter Park, FL (US); Jason M. Eichenholz, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/031,815

(22) Filed: Jul. 10, 2018

(65) Prior Publication Data

US 2020/0018854 A1    Jan. 16, 2020

(51) Int. Cl.
| | | |
|---|---|---|
| *G01S 17/18* | (2020.01) | |
| *H04N 5/232* | (2006.01) | |
| *G02B 26/10* | (2006.01) | |
| *G01S 7/481* | (2006.01) | |
| *G01S 17/89* | (2020.01) | |

(52) U.S. Cl.
CPC ............ *G01S 17/18* (2020.01); *G01S 7/4817* (2013.01); *G01S 17/89* (2013.01); *G02B 26/105* (2013.01); *H04N 5/23216* (2013.01)

(58) Field of Classification Search
CPC .... G01S 3/7867; G01S 7/4813; G01S 7/4814; G01S 7/4816; G01S 17/023; G01S 17/58; G01S 17/87; G01S 17/88; G01S 17/89; G01S 17/933; G01S 7/003
See application file for complete search history.

(56) References Cited

U.S. PATENT DOCUMENTS

| | | | |
|---|---|---|---|
| 5,006,721 A | | 4/1991 | Cameron et al. |
| 5,893,085 A | * | 4/1999 | Phillips ................. G01S 7/4802 706/50 |
| 6,449,384 B2 | | 9/2002 | Laumeyer et al. |
| 6,710,324 B2 | | 3/2004 | Hipp |
| 6,723,975 B2 | | 4/2004 | Saccomanno |
| 6,747,747 B2 | | 6/2004 | Hipp |
| 6,759,649 B2 | | 7/2004 | Hipp |
| 7,092,548 B2 | | 8/2006 | Laumeyer et al. |
| 7,209,221 B2 | | 4/2007 | Breed et al. |
| 7,345,271 B2 | | 3/2008 | Boehlau et al. |
| 7,443,903 B2 | | 10/2008 | Leonardo et al. |
| 7,532,311 B2 | | 5/2009 | Henderson et al. |
| 7,570,793 B2 | | 8/2009 | Lages et al. |
| 7,583,364 B1 | | 9/2009 | Mayor et al. |
| 7,649,920 B2 | | 1/2010 | Welford |

(Continued)

OTHER PUBLICATIONS

International Search Report dated Oct. 30, 2019 for PCT/US2019/041139.

*Primary Examiner* — Luke D Ratcliffe

(57) ABSTRACT

A machine vision system comprises a camera configured to generate one or more images of a field of regard of the camera, a lidar system, and a processor. The lidar system includes a laser configured to emit light, where the emitted light is directed toward a region within the field of regard of the camera and a receiver configured to detect light returned from the emitted light. The processor is configured to receive an indication of a location based on the returned light and determine whether a solid object is present at the location based on the one or more images.

18 Claims, 15 Drawing Sheets

(56) References Cited

U.S. PATENT DOCUMENTS

| | | |
|---|---|---|
| 7,652,752 B2 | 1/2010 | Fetzer et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,548,014 B2 | 10/2013 | Fermann et al. |
| 8,625,080 B2 | 1/2014 | Heizmann et al. |
| 8,675,181 B2 | 3/2014 | Hall |
| 8,723,955 B2 | 5/2014 | Kiehn et al. |
| 8,767,190 B2 | 7/2014 | Hall |
| 8,796,605 B2 | 8/2014 | Mordarski et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | d'Aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jachman et al. |
| 9,383,445 B2 | 7/2016 | Lu et al. |
| 9,383,753 B1 | 7/2016 | Templeton et al. |
| RE46,672 E | 1/2018 | Hall |
| 2004/0178945 A1 | 9/2004 | Buchanan |
| 2006/0290920 A1 | 12/2006 | Kampchen et al. |
| 2009/0273770 A1 | 11/2009 | Bauhahn et al. |
| 2010/0034221 A1 | 2/2010 | Dragic |
| 2012/0044476 A1* | 2/2012 | Earhart .............. G01S 3/7867 356/4.01 |
| 2012/0081544 A1 | 4/2012 | Wee |
| 2012/0227263 A1 | 9/2012 | Leclair et al. |
| 2013/0033742 A1 | 2/2013 | Rogers et al. |
| 2014/0111805 A1 | 4/2014 | Albert et al. |
| 2014/0168631 A1 | 6/2014 | Haslim et al. |
| 2014/0176933 A1 | 6/2014 | Haslim et al. |
| 2014/0211194 A1* | 7/2014 | Pacala .................. G01S 7/4813 356/5.01 |
| 2014/0293263 A1 | 10/2014 | Justice et al. |
| 2014/0293266 A1 | 10/2014 | Hsu et al. |
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1 | 7/2015 | Zhu |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0301182 A1 | 10/2015 | Geiger et al. |
| 2015/0323654 A1 | 11/2015 | Jachmann et al. |
| 2015/0378023 A1 | 12/2015 | Royo Royo et al. |
| 2015/0378241 A1 | 12/2015 | Eldada |
| 2016/0025842 A1 | 1/2016 | Anderson et al. |
| 2016/0047896 A1 | 2/2016 | Dussan |
| 2016/0047901 A1 | 2/2016 | Pacala et al. |
| 2016/0049765 A1 | 2/2016 | Eldada |
| 2016/0096477 A1 | 4/2016 | Biemer |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0210525 A1 | 7/2016 | Yang et al. |
| 2016/0245919 A1 | 8/2016 | Kalscheur et al. |
| 2017/0242117 A1 | 8/2017 | Izzat et al. |
| 2017/0257617 A1* | 9/2017 | Retterath .............. G01S 17/107 |
| 2018/0032042 A1 | 2/2018 | Turpin et al. |

\* cited by examiner

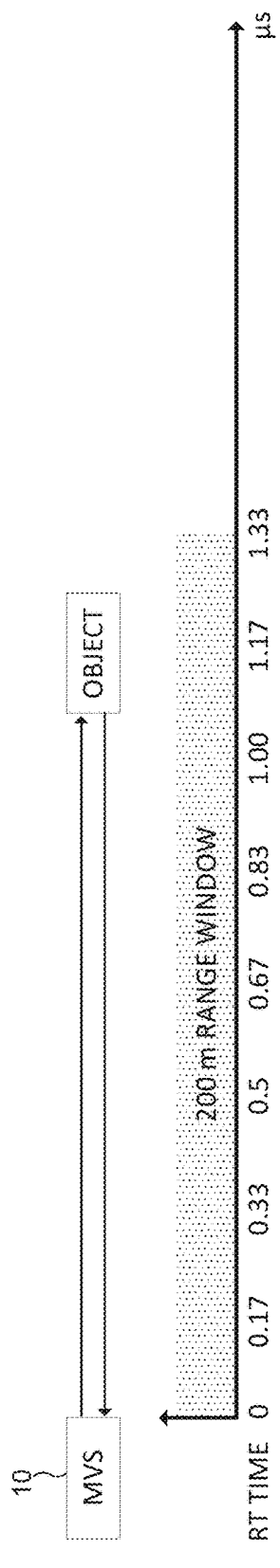
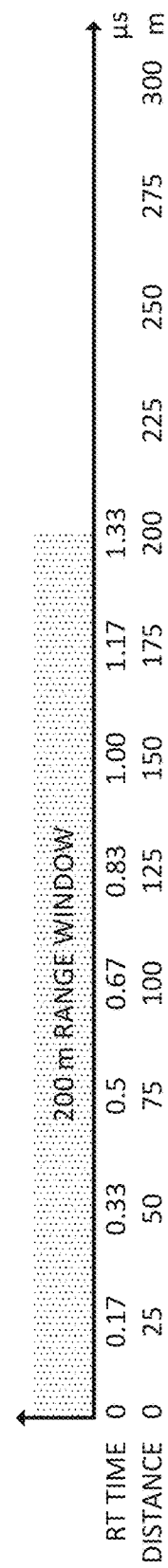
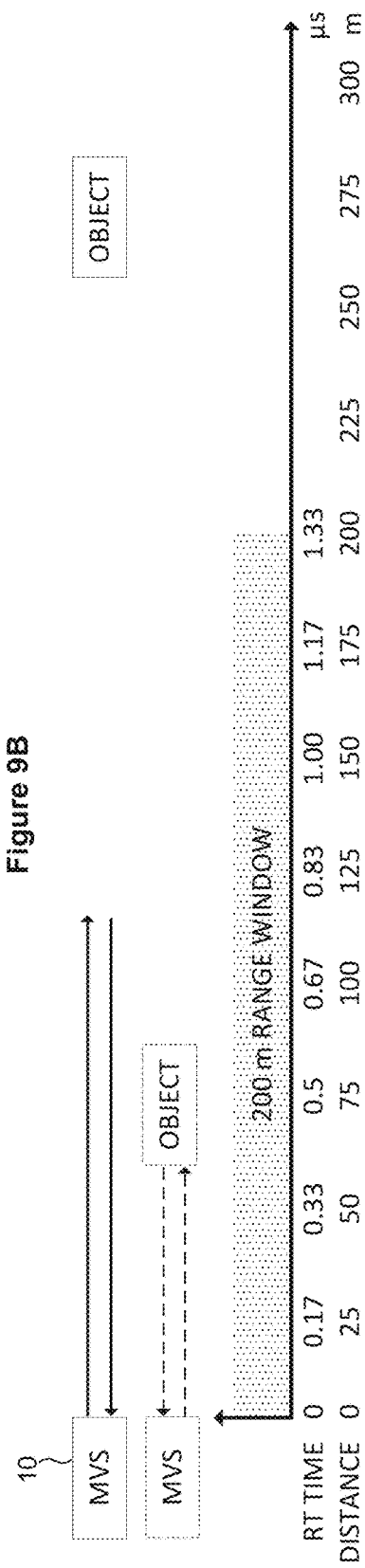
Figure 9A
Figure 9B
Figure 9C

CAMERA-GATED LIDAR SYSTEM

FIELD OF TECHNOLOGY

This disclosure generally related to lidar systems and, more particularly, lidar systems that use a camera to identify spurious pulse returns.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light detection and ranging (lidar) is a technology that can be used to measure distances to remote targets. Typically, a lidar system includes a light source and an optical receiver. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

A typical lidar system is configured to wait for the scattered light to return during a certain fixed period of time $t_{max}$ corresponding to the time it takes a light pulse to travel the maximum distance at which the lidar system is configured to detect targets, and back. For example, the lidar system may be configured to detect objects up to 200 meters away, and $t_{max}$ accordingly can be approximately 1.33 µs. After $t_{max}$, the lidar system generates the next light pulse.

In some cases, however, an emitted pulse of light is scattered by atmospheric obscurants to produce a spurious return. In particular, the lidar system detects a return pulse that appears to represent a solid object at a location where no solid objects are present. Further, atmospheric obscurants in some cases only partially scatter a pulse of light, and the remaining portion of the pulse of light reaches a target within the maximum range of the lidar system. The emitted pulse in this case corresponds to multiple returns during the same ranging event. Still further, a highly reflective object located beyond the maximum range of the lidar system can generate a return that the lidar system detects only during a subsequent ranging event, after a new pulse of light is emitted, resulting in the so-called "range wrap" problem. Highly reflective objects can also cause spurious returns when a pulse is reflected multiple times between emission and detection. For example, an emitted pulse may reflect from a puddle on the road, then reflect from a target, then from the puddle again, before reaching the detector. Such returns can be classified as "multi-path" returns. Additionally, a lidar system can receive a scattered pulse originating at a different lidar system and generate a return that can be classified as interference. Analogously, when a lidar comprises multiple optical heads and/or detectors, a lidar pulse that was intended for reception by one detector may reach another detector, generating a return that can be classified as cross-talk.

SUMMARY

A machine vision system of this disclosure includes a lidar system and a camera, where the fields of regard of the lidar system and the camera at least partially overlap. The machine vision system uses data captured by the camera to determine which of one more returns detected by the lidar system is indicative of a solid object at the location suggested by the lidar returns.

An example embodiment of these techniques is a machine vision system including a camera configured to generate one or more images of a field of regard (FOR) of the camera, a lidar system, and a processor. The lidar system includes a laser configured to emit light, such that the lidar system directs the emitted light toward a region within the FOR of the camera, and a receiver configured to detect light returned from the emitted light. The processor is configured to receive an indication of a location based on the returned light and determine whether a solid object is present at the location based on the one or more images.

Another example embodiment of these techniques is a machine vision system including a camera configured to generate one or more images of a field of regard (FOR) of the camera, a lidar system, and a processor. The lidar system includes a laser configured to emit a pulse of light, such that the lidar system directs the emitted pulse of light toward a region within the FOR of the camera, and a receiver configured to detect light returned from the emitted pulse of light. The processor is configured to receive an indication of a location based on the returned light and determine whether a solid object is present at the location based on the one or more images.

Another example embodiment of these techniques is a machine vision system including a camera configured to generate one or more images of a field of regard (FOR) of the camera, a lidar system, and a processor. The lidar system includes a laser configured to emit light, such that the lidar system directs the emitted light toward a region within the FOR of the camera, and a receiver configured to detect light returned from the emitted light. The processor is configured to receive an indication of a location based on the returned light, detect an obscurant in a path of the emitted light, using the one or more images generated by the camera, and discard the indication of location in response to detection of the obscurant.

Another example embodiment of these techniques is a lidar system comprising a laser configured to emit light, a receiver configured to detect light returned from the emitted light, and a processor configured to receive, from a camera with an FOR which the scan pattern of the scanner at least partially overlaps, data descriptive of a scene within the FOR of the camera, receive an indication of a location based on the returned light, and determine whether a solid object is present at the location using the data descriptive of the scene.

Another example embodiment of these techniques is a method for operating a machine vision system. The method includes receiving, from a camera, data descriptive of a scene within a field of regard (FOR) of the camera; emitting, by a laser operating in a lidar system, light; directing the emitted light toward a region within the FOR of the camera; detecting light returned from the emitted light; receiving an indication of a location based on the returned light; and determining, by a processor, whether a solid object is present at the location, based on the data descriptive of the scene.

Yet another example embodiment of these techniques is a machine vision system comprising a camera configured to generate one or more images of a field of regard (FOR) of the camera, a lidar system, and a processor. The lidar system includes a laser configured to emit a pulse of light toward a region within the FOR of the camera, and a receiver configured to detect one or more returns that include scattered light from the emitted pulse. The processor is configured to cause the lidar system to select, using the one or more images generated by the camera, at least one of the detected returns, and cause the lidar system to generate, based on the selection, one or more lidar pixel values corresponding to the emitted pulse of light. In various implementations, this system can include one or more of the following additional features. The lidar system includes a scanner configured to direct the emitted light in accordance with a scan pattern contained within an FOR of the lidar system, the scan pattern at least partially overlapping the FOR of the camera. The emitted pulse of light comprises amplitude frequency-modulated light of constant intensity. The processor is further configured to (i) detect an atmospheric obscurant in a path of the second emitted pulse of light, using the one or more images generated by the camera, where the atmospheric obscurant produces at least one of the detected returns, and (ii) cause the lidar system to discard the at least one of the second detected returns produced by the atmospheric obscurant (the atmospheric obscurant can include one of rain, fog, haze, dust, or car exhaust). The processor is further configured to cause the lidar system to select the last one of the detected second returns to generate the lidar pixel value, in response to detecting the atmospheric obscurant. The processor is further configured to detect an absence of targets along a path of the emitted pulse within a maximum range of the lidar system, using the one or more images, and, in response to detecting the absence of targets, cause the lidar system to discard all of the one or more returns. The processor is further configured to detect absence of targets along a path of the emitted pulse within a certain range smaller than the maximum range of the lidar system, using the one or more images, and, in response to detecting the absence of targets within the certain range, cause the lidar system to discard those of the one or more returns that are associated with distances within the certain range. The processor is further configured to detect a highly reflective object in a path of the emitted pulse of light, at an approximate distance greater than a maximum range of the lidar system, where the highly reflective object produces at least one of the detected returns, and cause the lidar system to discard at least one of the detected returns produced by the highly reflective object. The processor is further configured to, for each of the one or more returns, (i) determine a shape of a corresponding pulse, (ii) determine whether the determine shape corresponds to a result of scattering by (a) rain or (b) one of fog, haze, or dust, to generate pulse classification, and (iii) cause the lidar system to select one or more of the detected returns, or the default value using the generated pulse classifications along with the one or more images generated by the camera. The processor is further configured to determine that one of the detected returns is an extended return, shaped as a pulse extended over a period of time greater than a threshold value, detect a likely target return, shaped as a short pulse superimposed on the extended return, and in response to detecting the likely target return, cause the lidar system to select the likely target return to generate the lidar pixel value. The processor is further configured to determine a type of object disposed in a path of the emitted pulse of light, determine, based on the determined type of object, an expected shape of a return, and cause the lidar system to select, from among the detected one or more returns, a return with a shape most proximate to the expected shape. The processor is further to detect an approximate distance to a target using the one or more images generated by the camera, and select one or more lidar returns based on the detected approximate distance to the target. The processor is further configured to assign a confidence tag to the generated lidar pixel value in view of the selection of the one of the detected returns or the default value. The processor is further configured to assign the confidence tag in view of a shape of the selected return.

Still another example embodiment of these techniques is a lidar system comprising a laser configured to emit a pulse of light toward one or more possible targets, a receiver configured to detect one or more returns that include scattered light from the emitted pulse, and a processor. The processor is configured to receive, from a camera with a field of regard (FOR) which includes the direction of the possible targets of the emitted pulse of light, data descriptive of a scene within the FOR of the camera, cause the lidar system to select, using the data descriptive of the scene, at least one of the detected returns, and cause the lidar system to generate, based on the selection, one or more lidar pixel values corresponding to the emitted pulse of light. In various implementations, this method can include one or more of the following additional features. The system includes a scanner configured to direct the emitted pulse of light in accordance with a scan pattern contained within a field of regard (FOR) of the lidar system, where the scan pattern of the scanner at least partially overlaps the FOR of the camera. The system includes a camera interface to communicatively couple the lidar system to the camera operating separately and independently of the lidar system, where the processor receives the data descriptive of the scene via the camera interface. The data descriptive of the scene received via the camera interface includes, for a plurality of camera pixels, an approximate distance to a set of relevant targets. The data descriptive of the scene received via the camera interface includes, for a plurality of camera pixels, respective indicators of whether an obscurant is present along an optical path corresponding to the camera pixel, within a certain distance of the camera. The indicators indicate, for the respective pixels, whether an atmospheric obscurant is present along the corresponding optical path. The indicators indicate, for the respective pixels, whether a highly reflective target is present along the optical path. The camera is integrated into the lidar system, and the system further comprises a housing enclosing the scanner, the receiver, and the camera.

Another example embodiment of these techniques is a method in a lidar system for generating lidar pixel values. The method includes emitting a pulse of light, directing the emitted pulse of light in accordance with a scan pattern contained within a field of regard (FOR) of the lidar system, receiving, from a camera with a field of regard (FOR), data descriptive of a scene within the FOR of the camera, selecting, using the data descriptive of the scene, at least one of the detected returns, and generating, based on the selection, one or more lidar pixel values corresponding to the emitted pulse of light. In various implementations, this method can include one or more of the following additional features. The method includes emitting a second pulse of light, directing the emitted second pulse of light in accordance with a scan pattern contained within a field of regard (FOR) of the lidar system, detecting one or more second returns that include scattered light from the second emitted pulse, and discarding the at least one of the second detected returns, using the data descriptive of the scene received from the camera. The method further includes determining whether an atmospheric obscurant is present in a path of the second emitted pulse of light, using the data descriptive of the scene received from the camera, and discarding the at least one of the second detected returns is in view of the presence of the obscurant. The atmospheric obscurant includes one of rain, fog, haze, dust, steam, or car exhaust. The method further includes, in response to detecting the atmospheric obscurant, selecting the last one of the second detected returns to generate the lidar pixel value. The method further includes detecting absence of targets along a path of the emitted pulse within a maximum range of the lidar system, using the data descriptive of the scene, and in response to detecting the absence of targets, discarding all of the one or more second returns. The method further includes detecting absence of targets along a path of the emitted pulse within a certain range smaller than the maximum range of the lidar system, using the data descriptive of the scene, and, in response to detecting the absence of targets within the certain range, discarding those of the one or more returns that are associated with distances within the certain range. The method further includes determining one of an interference or cross-talk event, where the discarded one or more returns are due to the detected interference or cross-talk event. The method further includes detecting a highly reflective object in a path of the emitted pulse of light, at an approximate distance greater than a maximum range of the lidar system, where the highly reflective object produces at least one of the detected returns, and discarding the at least one of the detected returns is in view of the highly reflective object. The method further includes detecting, using the data descriptive of the scene, a presence of a highly reflective surface in the path of the second pulse of light, and discarding the at least one of the detected returns is in view of a multipath return due to the highly reflective surface. The method further includes estimating, using the data descriptive of the scene, a set of approximate distances to a set of targets, and selecting the detected returns that correspond to a set of the approximate distances to generate one or more lidar pixel values. The method further includes for each of the one or more returns, determining a shape of a corresponding pulse, determining whether the determine shape corresponds to a result of scattering by (i) rain or (ii) one of fog, haze, or dust, to generate pulse classification, and selecting one or more of the detected returns, using the generated pulse classifications along with the data descriptive of the scene received from the camera. The data descriptive of the scene is received via a camera interface via which the lidar system is communicatively coupled to a camera operating separately and independently of the lidar system.

At least some of the features listed above in connection with a certain embodiment also can be used with another one or several embodiments.

BRIEF DESCRIPTION OF THE DRAWINGS

FIG. 9A illustrates an example scenario in which a machine vision system detects a return from an emitted pulse scattered by an object located within the maximum range of the machine vision system;

FIG. 9B illustrates an example scenario in which an object located beyond the maximum range of the machine vision system scatters a pulse of light emitted by the machine vision system;

FIG. 9C illustrates an example scenario in which the machine vision system detects scattered pulse of light of FIG. 9B, during a subsequent ranging event;

DETAILED DESCRIPTION

Example Machine Vision System Including a Lidar and a Camera

Figure 1:
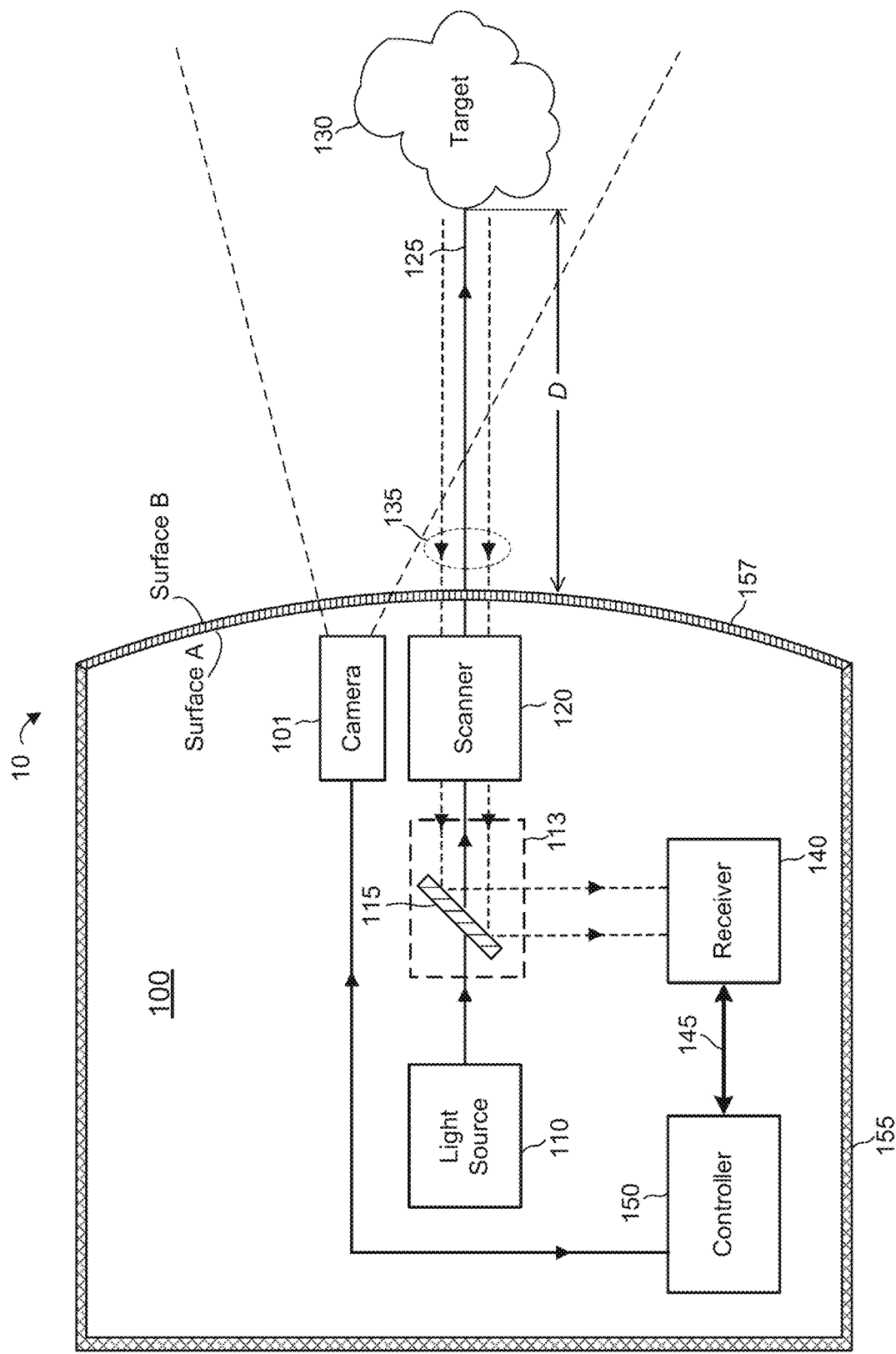
FIG. 1 is a block diagram of an example machine vision system including a light detection and ranging (lidar) system and a camera, in which the techniques of this disclosure can be implemented.

FIG. 1 illustrates an example machine vision system 10 that includes a light detection and ranging (lidar) system 100 and a camera 101. Depending on the implementation, the camera 101 can operate separately and independently of the lidar system 100 or as a component of the lidar system 100. The camera 101 may have a separate housing or it may be housed together with the lidar system 100. In any case, however, the scan pattern of the lidar system 100 overlaps the field of regard (FOR) of the camera 101 at least partially. Thus, at least some of the information the lidar system 100 and the camera 101 are configured to capture pertains to the same region of space.

The lidar system 100 may include a light source 110, an optical coupling component or duplexer 113 including a mirror 115, a scanner 120, a receiver 140, and a controller 150. The light source 110 may be, for example, a laser which emits light having a particular operating wavelength in the infrared, visible, or ultraviolet portions of the electromagnetic spectrum.

In operation, the light source 110 emits an output beam of light 125 which may be continuous-wave (CW), discretely pulsed, or modulated in any suitable manner for a given application. In this disclosure, the emitted light in each case can be described as a pulse of light. The output beam of light 125 is directed downrange toward a remote target 130 located a distance D from the lidar system 100 and at least partially contained within a field of regard of the system 100.

Once the output beam 125 reaches the downrange target 130, the target 130 may scatter or, in some cases, reflect at least a portion of light from the output beam 125, and some of the scattered or reflected light may return toward the lidar system 100. The input beam 135 passes through the scanner 120 to the mirror 115, which in turn directs the input beam 135 to the receiver 140. The input beam 135 may be referred to as a return beam, received beam, return light, received light, input light, scattered light, or reflected light. As used herein, scattered light may refer to light that is scattered or reflected by the target 130.

The operating wavelength of a lidar system 100 may lie, for example, in the infrared, visible, or ultraviolet portions of the electromagnetic spectrum. The Sun also produces light in these wavelength ranges, and thus sunlight can act as background noise which can obscure signal light detected by the lidar system 100. This solar background noise can result in false-positive detections or can otherwise corrupt measurements of the lidar system 100, especially when the receiver 140 includes SPAD detectors (which can be highly sensitive).

The receiver 140 may receive or detect photons from the input beam 135 and generate one or more representative signals. For example, the receiver 140 may generate an output electrical signal 145 that is representative of the input beam 135. The receiver may send the electrical signal 145 to the controller 150. Depending on the implementation, the controller 150 may include one or more processors, an application-specific integrated circuit (ASIC), a field-programmable gate array (FPGA), and/or other suitable circuitry configured to analyze one or more characteristics of the electrical signal 145 to determine one or more characteristics of the target 130, such as its distance downrange from the lidar system 100. More particularly, the controller 150 may analyze the time of flight or phase modulation for the beam of light 125 transmitted by the light source 110. If the lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s).

The target 130 may be located a distance D from the lidar system 100 that is less than or equal to a maximum range $R_{MAX}$ of the lidar system 100. The maximum range $R_{MAX}$ (which also may be referred to as a maximum distance) of a lidar system 100 may correspond to the maximum distance over which the lidar system 100 is configured to sense or identify targets that appear in a field of regard of the lidar system 100. As a specific example, a lidar system with a 200-m maximum range may be configured to sense or identify various targets located up to 200 m away. For a lidar system with a 200-m maximum range ($R_{MAX} = 200$ m), the time of flight corresponding to the maximum range is approximately $2 \cdot R_{MAX}/c \approx 1.33$ μs. Although this disclosure uses the term "maximum range" in the context of the lidar system, the lidar system may detect light scattered from an object beyond the maximum range, which may result in the range wrap discussed herein.

In some implementations, the light source 110, the scanner 120, and the receiver 140 may be packaged together within a single housing 155, which may be a box, case, or enclosure that holds or contains all or part of a lidar system 100. The housing 155 includes a window 157 through which the beams 125 and 135 pass. In one example implementation, the lidar-system housing 155 contains the light source 110, the overlap mirror 115, the scanner 120, and the receiver 140 of a lidar system 100. The controller 150 may reside within the same housing 155 as the components 110, 120, and 140, or the controller 150 may reside remotely from the housing.

Although this disclosure describes example embodiments of lidar systems or light sources that produce light waveforms that include pulses of light, the embodiments described or illustrated herein may also be applied to other types of light waveforms, including continuous-wave (CW) light or modulated light waveforms. For example, a lidar system as described or illustrated herein may include a light source configured to produce pulses of light that are characterized by their intensity that varies in time. Alternatively, a lidar system may be configured to act as a frequency-modulated continuous-wave (FMCW) lidar system and may include a light source configured to produce CW light or a frequency-modulated light waveform.

Although the component 113 in this example implementation includes the overlap mirror 115 through which the output beam 125 travels from the light source 110 toward the scanner 120, in general the component 113 can include a mirror without an aperture so that the output beam 125 travels past the mirror 115 in accordance with off-axis illumination technique, for example. More generally, the component 113 can include any suitable optical elements to direct the output beam 125 toward the scanner 120 and the input beam 135 toward the receiver 140.

Generally speaking, the scanner 120 steers the output beam 125 in one or more directions downrange. The scanner 120 may include one or more scanning mirrors and one or more actuators driving the mirrors to rotate, tilt, pivot, or move the mirrors in an angular manner about one or more axes, for example. For example, the first mirror of the scanner may scan the output beam 125 along a first direction, and the second mirror may scan the output beam 125 along a second direction that is substantially orthogonal to the first direction. As another example, a single mirror may be used to scan both directions.

The one or more scanning mirrors of the scanner 120 may be communicatively coupled to the controller 150 which may control the scanning mirror(s) so as to guide the output beam 125 in a desired direction downrange or along a desired scan pattern. In general, a scan pattern may refer to a pattern or path along which the output beam 125 is directed.

In operation, the light source 110 may emit pulses of light which the scanner 120 scans across a field of regard of the lidar system 100. A field of regard (FOR) of the lidar system 100 may refer to an area, region, or angular range over which the lidar system 100 may be configured to scan or capture distance information. The target 130 may scatter one or more of the emitted pulses, and the receiver 140 may detect at least a portion of the pulses of light scattered by the target 130.

The receiver 140 in some implementations receives or detects at least a portion of the input beam 135 and produces an electrical signal that corresponds to the input beam 135. For example, if the input beam 135 includes light scattered from the emitted pulse, then the receiver 140 may produce an electrical current or voltage pulse that corresponds to the scattered light detected by the receiver 140. The receiver 140 may have an active region or an avalanche-multiplication region that includes silicon, germanium, or InGaAs.

The controller 150 may be electrically coupled or otherwise communicatively coupled to one or more of the light source 110, the scanner 120, and the receiver 140. The controller 150 may receive electrical trigger pulses or edges from the light source 110, where each pulse or edge corresponds to the emission of an optical pulse by the light source 110. The controller 150 may provide instructions, a control signal, or a trigger signal to the light source 110 indicating when the light source 110 should produce optical pulses. For example, the controller 150 may send an electrical trigger signal that includes electrical pulses, where the light source 110 emits an optical pulse in response to each electrical pulse. Further, the controller 150 may cause the light source 110 to adjust one or more of the frequency, period, duration, pulse energy, peak power, average power, or wavelength of the optical pulses produced by light source 110.

The controller 150 may determine a time-of-flight value for an optical pulse based on timing information associated with when the pulse was emitted by light source 110 and when a portion of the pulse (e.g., the input beam 135) was detected or received by the receiver 140. The controller 150 may include circuitry that performs signal amplification, sampling, filtering, signal conditioning, analog-to-digital conversion, time-to-digital conversion, pulse detection, threshold detection, rising-edge detection, or falling-edge detection.

The controller 150 also can receive signals from one or more sensors 158 (not shown), which in various implementations are internal to the lidar system 100 or, as illustrated in FIG. 1, external to the lidar system 100. The one or more sensors 158 can include a camera, such as a CCD or CMOS digital camera, microphone or a microphone array, a radar, etc. In some implementations, the lidar system 100 uses signals from the one or more sensors 158 to determine which portion of the field of regard overlaps the ground in front of the lidar system.

As indicated above, the lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR.

The camera 101 may include a CCD camera, a CMOS camera, or two or more of such cameras. The camera 101 can be equipped with one or more processors configured to implement image processing, and/or the camera 101 can be communicatively coupled to the controller 150, and image processing can be implemented in the controller 150. In operation, the camera 101 and/or the controller 150 can detect depth or relative distance of objects, identify types of objects, identify presence of atmospheric obscurants, etc. For convenience, processing of images is discussed below with reference to the camera 101, but it will be understood that, in various implementations, image processing can be additionally or alternatively implemented in the controller 150, a vehicle controller responsible for maneuvering an autonomous vehicle (see FIG. 6), or another suitable controller.

The camera 101 can be a stereo camera with two active regions. By analyzing registration of objects detected by the two active regions, the camera 101 can obtain information regarding the distance of the objects from the camera 101 using triangulation. In another implementation, the camera 101 perceives depth by comparing the relative motion of objects in the scene using a technique referred to as Simultaneous Localization And Mapping (SLAM). In another implementation, the camera 101 perceives depth by using the extent of known objects in an image, the extent of known objects in the real world, and the perspective information. For example, the width of the road or the road markings can provide cues to the distance of objects in an image similar to how distance of objects situated on the ground can be perceived from two dimensional drawings. To this end, the camera 101 can implement pattern recognition and classification techniques.

According to another approach, the camera 101 perceives depth information using time-gated exposures. This approach generally works best with active illumination and may be more suitable for night-time usage of the camera. Additionally or alternatively, the camera 101 can detect relative positions of objects in space by segmenting the image and identifying which objects are in the foreground of other objects. Moreover, the images from the camera 101 may be processed using a classifier that may generate at least approximate distance information. Techniques for operating the camera 101 are discussed further below.

Figure 2:
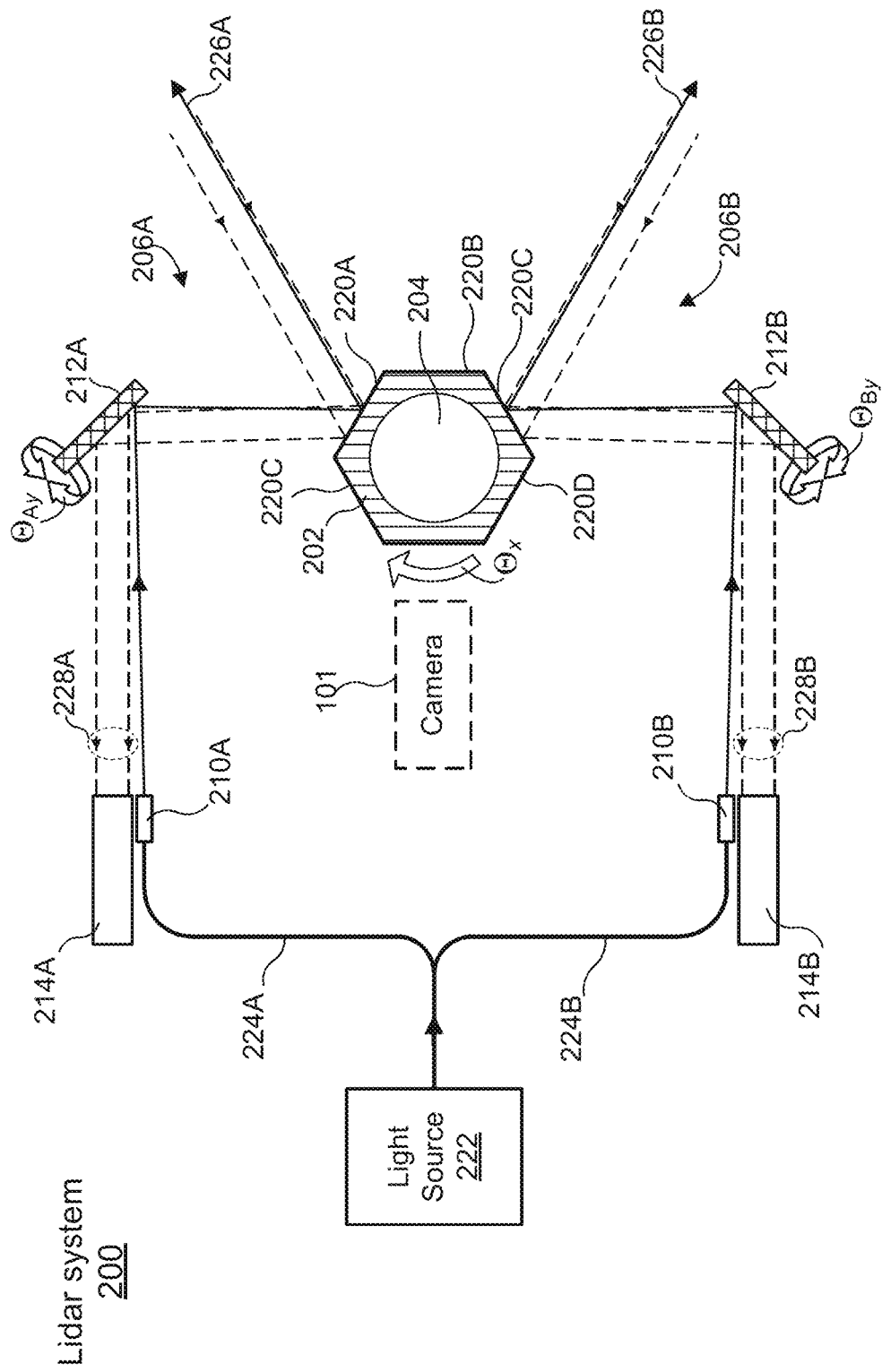
FIG. 2 is a block diagram of lidar system in which the scanner includes a polygon mirror.

FIG. 2 illustrates a lidar system 200 that includes a polygon mirror 202 driven by a motor 204. Similar to the lidar system 100, the lidar system 200 can operate in the machine vision system 10. The lidar system 200 operates in a two-eye configuration, with a first eye 206A and a second eye 206B. The first eye 206A includes a collimator 210A, a scan mirror 212A, and a receiver 214A, and the second eye 206B includes a collimator 210B, a scan mirror 212B, and a receiver 214B. The polygon mirror 202 may be in the form of a rotatable block with multiple reflective surfaces angularly offset from one another along the polygon periphery of the rotatable block. In this example implementation, the polygon mirror 202 has six reflective surfaces 220A, 220B, . . . 220F; however, the polygon mirror 202 in general can include any suitable number of surfaces, e.g., three, four, five, eight, etc. The motor 204 imparts rotation to the rotatable polygon mirror 202. The scan mirrors 212A and 212B are configured to rotate, in an oscillatory manner within a certain angular range, about the respective axis orthogonal to the axis of rotation of the polygon mirror 202.

Referring back to FIG. 1, the scanner 120 in some implementations includes a polygon mirror similar to the polygon mirror 202 and one or two mirrors similar to the scan mirrors 212A and 212B, depending on the number of eyes of the lidar system.

In the example implementations of FIG. 2, the camera 101 can be disposed on the same plane, a higher plane, or a lower plane as the components of the corresponding scanner.

Generating Pixels Within a Field of Regard of the Lidar Systems

Figure 3:
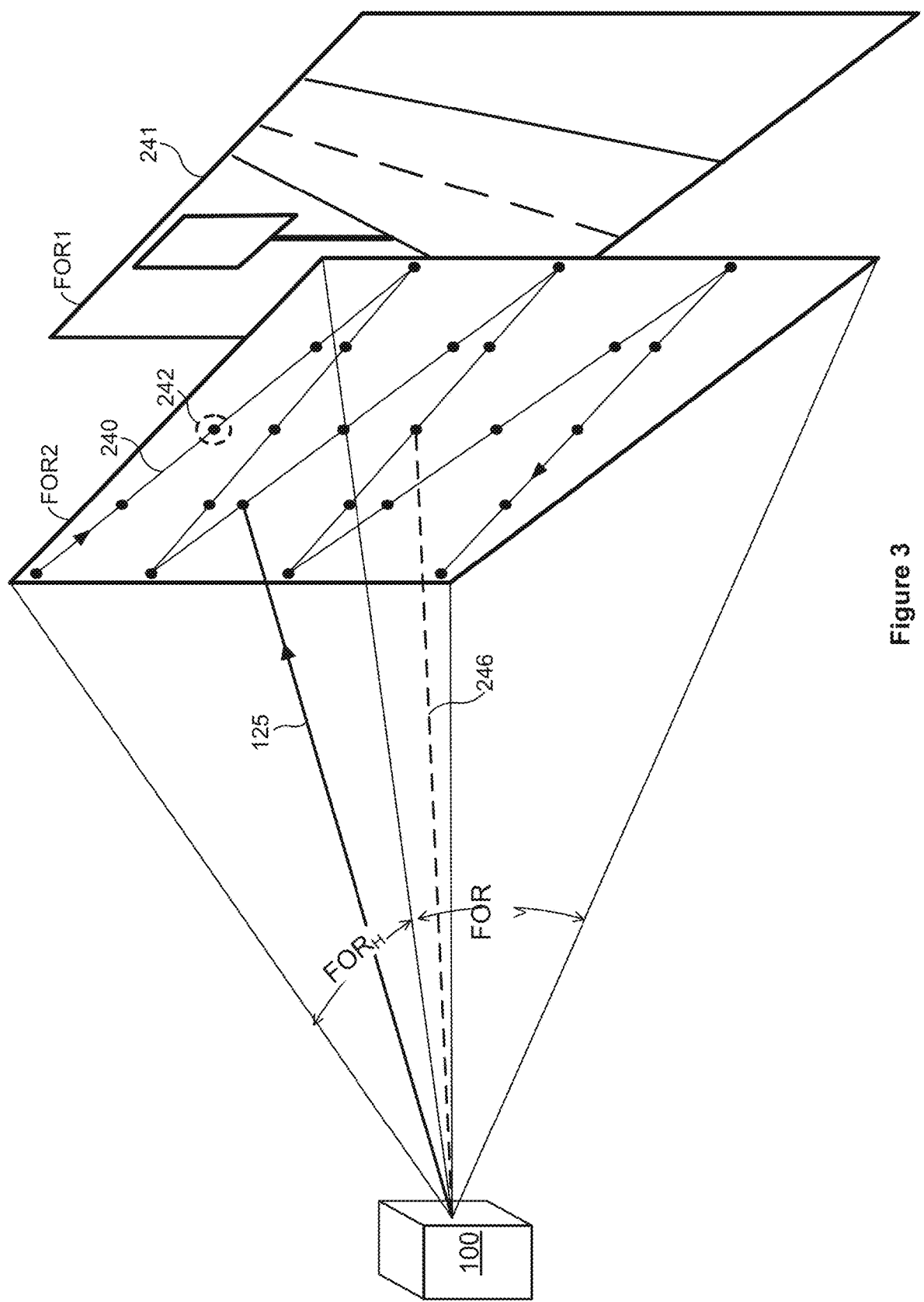
FIG. 3 illustrates an example scan pattern which the system of FIG. 1 can produce when identifying targets within a field of regard.

FIG. 3 illustrates an example scan pattern 240 which the lidar system 100 of FIG. 1 or the lidar system 200 of FIG. 2 can produce, along with an example image 241 captured by the camera 101. The scan pattern 240 overlaps the FOR of the camera 101 at least partially, and thus the lidar system 100 or 200 emits pulses in the direction of objects depicted in the image 241. However, some or all of the objects in the image 241 may be outside the maximum range of the lidar system 100 or 200.

Each pixel 242 may be associated with a distance (e.g., a distance to a portion of a target 130 from which the corresponding laser pulse was scattered) or one or more angular values. As an example, the pixel 242 may be associated with a distance value and two angular values (e.g., an azimuth and altitude) that represent the angular location of the pixel 242 with respect to the lidar system 100. In some implementations, a point cloud within a given frame may contain only information about scan directions that yielded measurable returns, while the scan directions that did not yield a return of interest may be omitted from the point cloud. A return of interest may be defined as a detected return that corresponds to a solid object. In other implementations, one or more pixel values may be reported for every direction in the scan. In such implementations, a default value may be used for pixels associated with directions in which no return of interest is detected.

Figure 4:
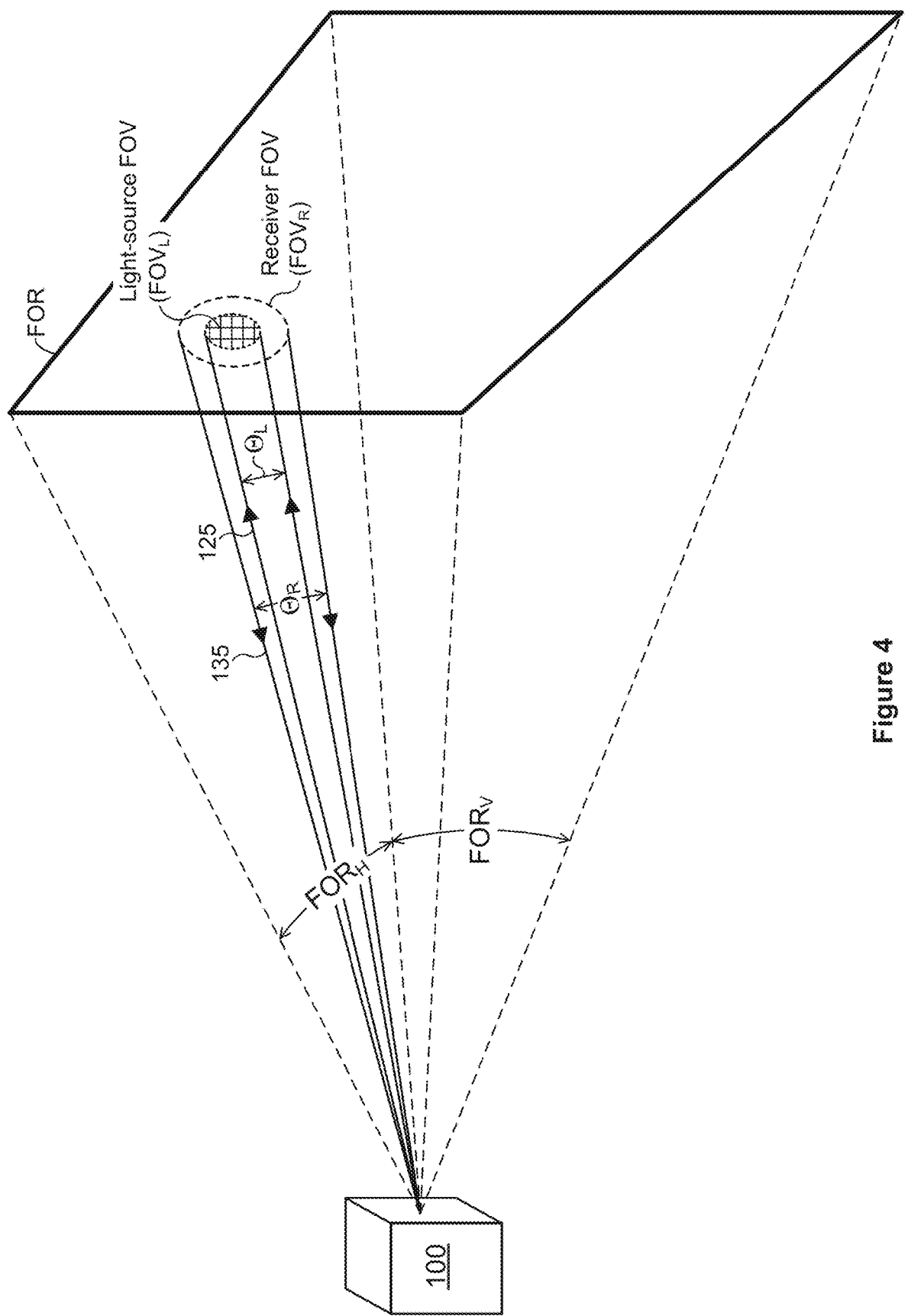
FIG. 4 schematically illustrates fields of view (FOVs) of a light source and a detector that can operate in the lidar system of FIG. 1.

Next, FIG. 4 illustrates an example light-source field of view ($FOV_L$) and receiver field of view ($FOV_R$) for the lidar system 100. The light source 110 may emit pulses of light as the $FOV_L$ and $FOV_R$ are scanned by the scanner 120 across a field of regard (FOR). The light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected.

A Machine Vision System Operating in a Vehicle

The machine vision system 10 of FIG. 1 can be integrated into a vehicle. In one example implementation, one lidar systems 100 may be integrated into a car. As another example, 4-10 lidar systems 100, each system having a 45-degree to 90-degree horizontal FOR, may be combined together to form a sensing system that provides a point cloud covering a 360-degree horizontal FOR.

In some implementations, one or more lidar systems 100 are included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. The lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar systems 100 are integrated into a vehicle as part of an autonomous-vehicle driving system. In an example implementation, the lidar system 100 provides information about the surrounding environment to a driving system of an autonomous vehicle. An autonomous-vehicle driving system may include one or more computing systems that receive information from the lidar system 100 about the surrounding environment, analyze the received information, and provide control signals to the vehicle's driving systems (e.g., steering wheel, accelerator, brake, or turn signal). The autonomous-vehicle driving system may analyze the received point clouds to sense or identify targets 130 and their respective locations, distances, or speeds, and the autonomous-vehicle driving system may update control signals based on this information. As an example, if the lidar system 100 detects a vehicle ahead that is slowing down or stopping, the autonomous-vehicle driving system may send instructions to release the accelerator and apply the brakes.

Figure 5:
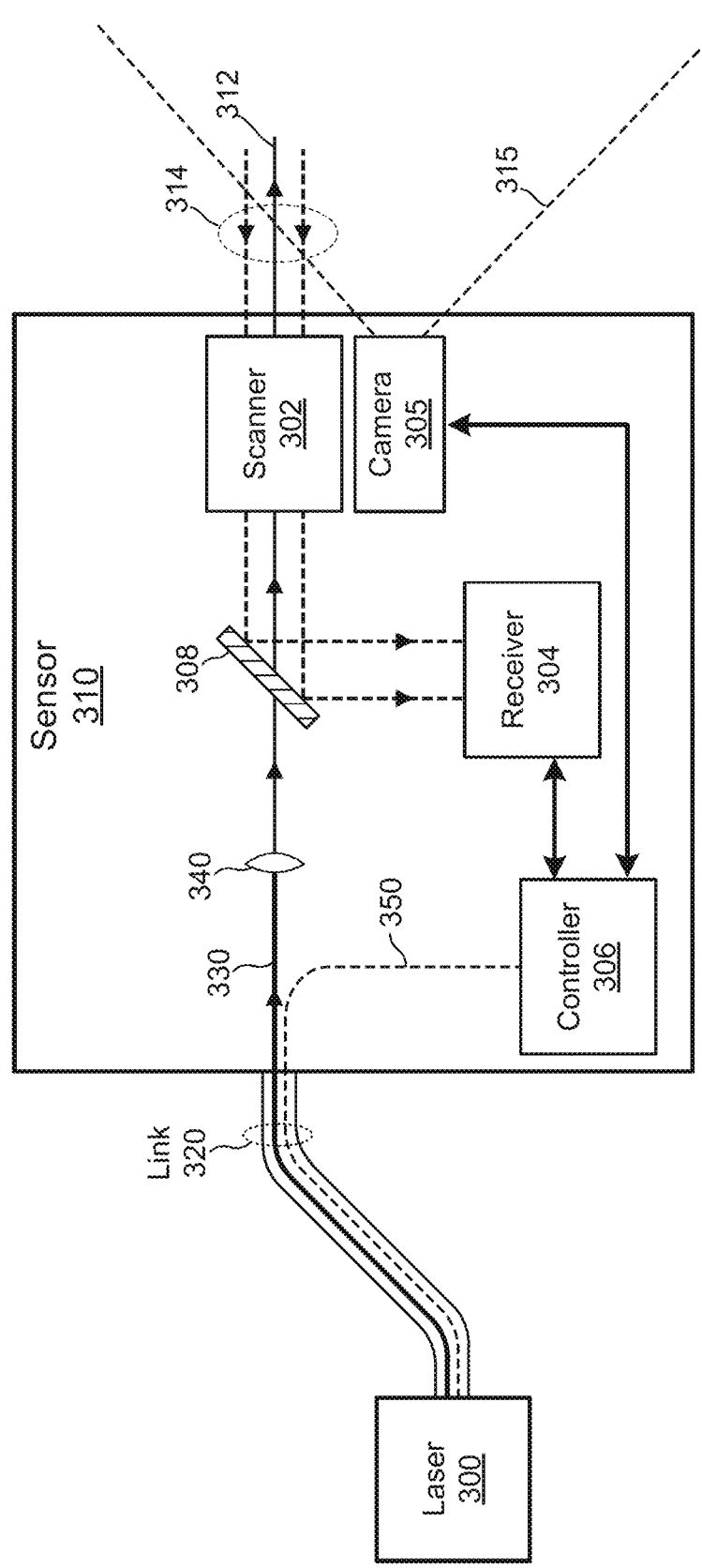
FIG. 5 illustrates an example configuration of the system of FIG. 1 or another suitable lidar system, in which a laser is disposed away from sensor components.

FIG. 5 illustrates an example configuration in which a laser-sensor link 320 includes an optical link 330 and an electrical link 350 coupled between a laser 300 and a sensor 310. The laser 300 may be configured to emit pulses of light and may be referred to as a laser system, laser head, or light source. The laser 300 may include, may be part of, may be similar to, or may be substantially the same as the light source 110 illustrated in FIG. 1 and discussed above. Further, the scanner 302, the receiver 304, the controller 306, and the mirror 308 may be similar to the scanner 120, the receiver 140, the controller 150, and the mirror 115 discussed above. In the example of FIG. 5, the laser 300 is coupled to the remotely located sensor 310 by a laser-sensor link 320 (which may be referred to as a link). The sensor 310 may be referred to as a sensor head and may include the mirror 308, the scanner 302, the receiver 304, and the controller 306. In an example implementation, the laser 300 includes a pulsed laser diode (e.g., a pulsed DFB laser) followed by an optical amplifier, and light from the laser 300 is conveyed by an optical fiber of the laser-sensor link 320 of a suitable length to the scanner 120 in a remotely located sensor 310.

The controller 306 is further coupled to a camera 305, which can be implemented and positioned similarly to the camera 101 discussed above. As illustrated in FIG. 5, the scanner scans a region at least partially disposed within the FOR of the camera 305.

In one implementation, the sensor 310 does not include the camera 305 and instead includes a camera interface to receive camera input from an external camera. The camera interface can be wired or wireless. As a more specific example, the vehicle in which the sensor 310 is implemented can include one or more cameras that operate separately and independently of the lidar system. The controller 306 can receive input from the one or more cameras via the camera interface and generate lidar pixel values using this input. In one such implementation, the controller receives complete images via the camera interface (e.g., in the JPEG format). In another implementation, the controller 306 receives a set of flags which the camera sets based on the results of processing the image. One flag for example can indicate whether fog has been detected, another flag indicates whether rain has been detected, yet another flag indicates whether gas exhaust been detected, etc. The flags can be set for each camera pixel or lidar pixel, depending on the implementation. The controller 306 also can receive an indication of the extent of the null-space (discussed in more detail below) via the camera interface. In other implementations, the controller that performs this processing may be located separately from sensor 310, or some parts of the processing may be performed in controller 306 and other parts in a separate controller.

Figure 6:
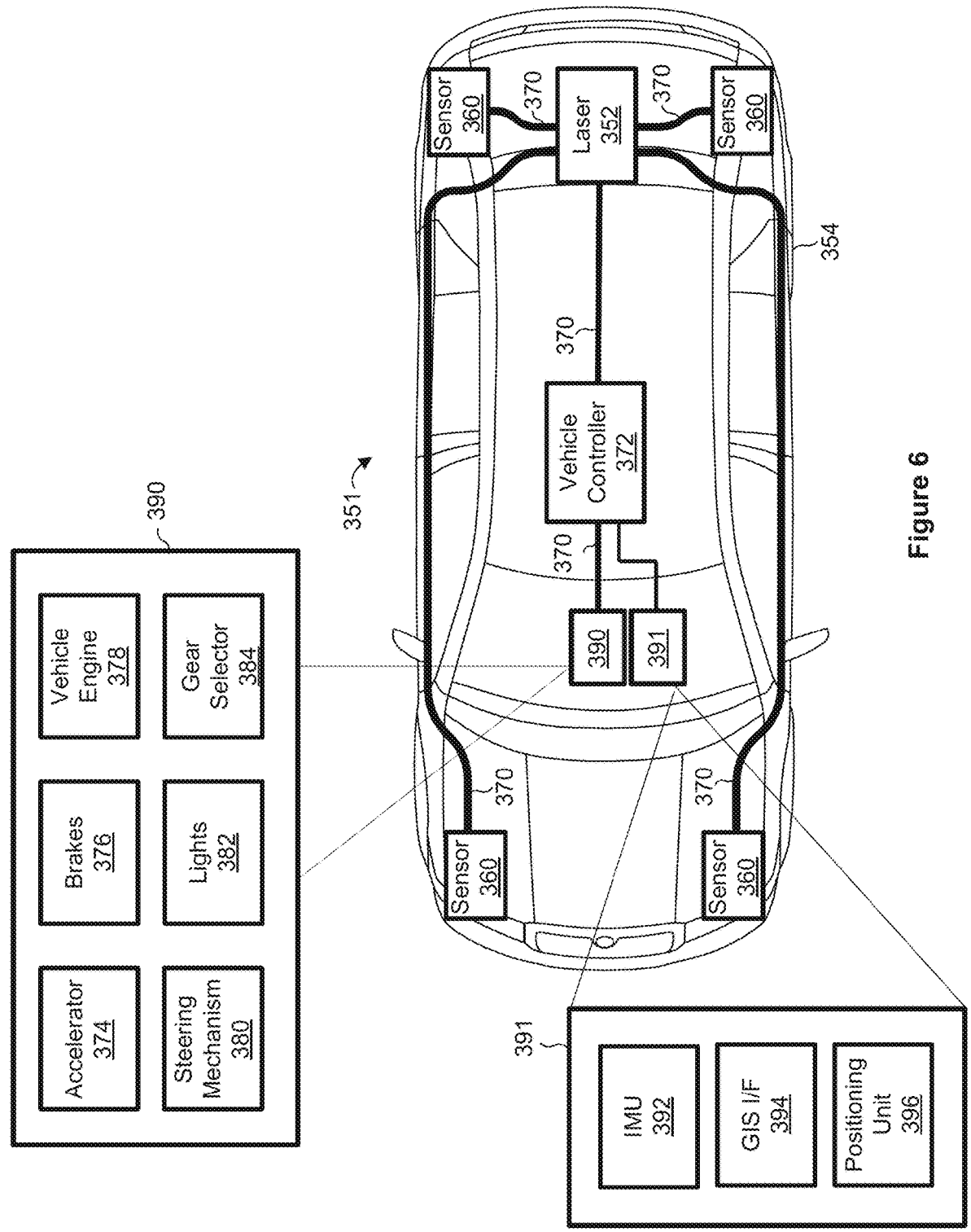
FIG. 6 illustrates an example vehicle in which the system of FIG. 1 can operate.

Next, FIG. 6 illustrates an example vehicle 354 with a lidar system 351 that includes a laser 352 with multiple sensor heads 360 coupled to the laser 352 via multiple laser-sensor links 370. The laser 352 and the sensor heads 360 may be similar to the laser 300 and the sensor 310 discussed above, in some implementations. For example, each of the laser-sensor links 370 may include one or more optical links and/or one or more electrical links. The sensor heads 360 in FIG. 6 are positioned or oriented to provide a greater than 360-degree view of an environment around the vehicle.

In the example of FIG. 6, four sensor heads 360 are positioned at or near the four corners of the vehicle (e.g., the sensor heads may be incorporated into a light assembly, side panel, bumper, or fender), and the laser 352 may be located within the vehicle (e.g., in or near the trunk). The four sensor heads 360 may each provide a 90° to 120° horizontal field of regard (FOR), and the four sensor heads 360 may be oriented so that together they provide a complete 360-degree view around the vehicle.

Data from each of the sensor heads 360 may be combined or stitched together to generate a point cloud that covers a 360-degree horizontal view around a vehicle. For example, the laser 352 may include a controller or processor that receives data from each of the sensor heads 360 (e.g., via a corresponding electrical link 370) and processes the received data to construct a point cloud covering a 360-degree horizontal view around a vehicle or to determine distances to one or more targets. The point cloud or information from the point cloud may be provided to a vehicle controller 372 via a corresponding electrical, optical, or radio link 370. The vehicle controller 372 then combines or stitches together the points clouds from the respective sensor heads 360 to construct a combined point cloud covering a 360-degree horizontal view. Still further, the vehicle controller 372 in some implementations communicates with a remote server to process point cloud data.

In any event, the vehicle 354 may be an autonomous vehicle where the vehicle controller 372 provides control signals to various components 390 within the vehicle 354 to maneuver and otherwise control operation of the vehicle 354. The components 390 are depicted in an expanded view in FIG. 6 for ease of illustration only. The components 390 may include an accelerator 374, brakes 376, a vehicle engine 378, a steering mechanism 380, lights 382 such as brake lights, head lights, reverse lights, emergency lights, etc., a gear selector 384, and/or other suitable components that effectuate and control movement of the vehicle 354. The gear selector 384 may include the park, reverse, neutral, drive gears, etc. Each of the components 390 may include an interface via which the component receives commands from the vehicle controller 372 such as "increase speed," "decrease speed," "turn left 5 degrees," "activate left turn signal," etc. and, in some cases, provides feedback to the vehicle controller 372.

In some implementations, the vehicle controller 372 receives point cloud data from the laser 352 or sensor heads 360 via the link 370 and analyzes the received point cloud data to sense or identify targets 130 and their respective locations, distances, speeds, shapes, sizes, type of target (e.g., vehicle, human, tree, animal), etc. The vehicle controller 372 then provides control signals via the link 370 to the components 390 to control operation of the vehicle based on the analyzed information. For example, the vehicle controller 372 may identify an intersection based on the point cloud data and determine that the intersection is the appropriate location at which to make a left turn. Accordingly, the vehicle controller 372 may provide control signals to the steering mechanism 380, the accelerator 374, and brakes 376 for making a proper left turn. In another example, the vehicle controller 372 may identify a traffic light based on the point cloud data and determine that the vehicle 354 needs to come to a stop. As a result, the vehicle controller 372 may provide control signals to release the accelerator 374 and apply the brakes 376.

In addition to the components 390, the vehicle 354 may be equipped with sensors and remote system interfaces 391, which can be communicatively coupled to the vehicle controller 372. The components 391 can include an Inertial Measurement Unit (IMU) 392, a Geographic Information System (GIS) interface 304 for obtaining mapping data from a remote server via a communication network, a positioning unit 396 such as a Global Positioning Service (GPS) receiver, etc. The vehicle controller 372 in some cases provides data from the components 391 to the lidar system 351.

Example Receiver Implementation

Figure 7:
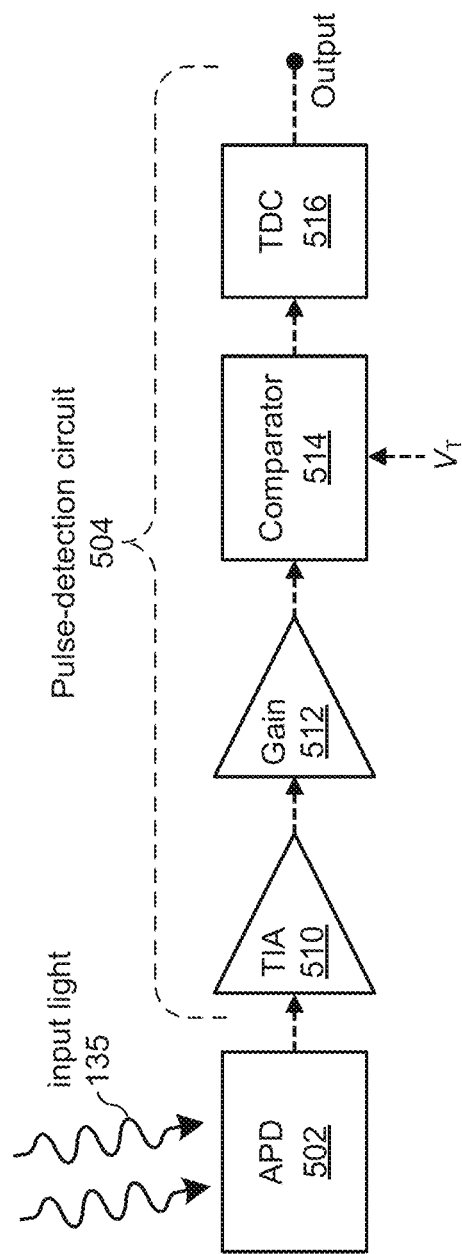
FIG. 7 illustrates an example photodiode coupled to a pulse-detection circuit, which can operate in the system of FIG. 1.

FIG. 7 shows an example receiver configuration that can operate in lidar system 100. FIG. 7 illustrates an avalanche photodiode (APD) 502 that detects input light 135, coupled to an example pulse-detection circuit 504. The pulse-detection circuit 504 can operate in the lidar system of FIG. 1 as part of the receiver 140, or any other suitable receiver. The pulse-detection circuit 504 alternatively can be implemented in the controller 150, or another suitable controller. In some implementations, parts of the pulse-detection circuit 504 can operate in a receiver and other parts of the pulse-detection circuit 504 can operate in a controller. For example, components 510 and 512 may be a part of the receiver 140, and components 514 and 516 may be a part of the controller 150.

The pulse-detection circuit 504 may include circuitry that receives a signal from a detector (e.g., an electrical current from the APD 502) and performs current-to-voltage conversion, signal amplification, sampling, filtering, signal conditioning, analog-to-digital conversion, time-to-digital conversion, pulse detection, threshold detection, rising-edge detection, or falling-edge detection. The pulse-detection circuit 504 may determine whether light scattered from the emitted pulse has been received by the APD 502 or may determine a time associated with receipt of scattered light by the APD 502. Additionally, the pulse-detection circuit 504 may determine a duration of a received optical pulse. In an example implementation, the pulse-detection circuit 504 includes a transimpedance amplifier (TIA) 510, a gain circuit 512, a comparator 514, and a time-to-digital converter (TDC) 516.

The time-to-digital converter (TDC) 516 may be configured to receive an electrical-edge signal from the comparator 514 and determine an interval of time between emission of a pulse of light by the light source and receipt of the electrical-edge signal. The output of the TDC 516 may be a numerical value that corresponds to the time interval determined by the TDC 516. Referring back to FIG. 1, the TDC 516 may send the numerical value to a processor or controller 150 of the lidar system 100, which may include a processor configured to determine a distance from the lidar system 100 to the target 130 based at least in part on an interval of time determined by a TDC 516.

Detecting and Processing Returns in a Lidar System

The machine vision system 10 of FIG. 1 (or another suitable machine vision system of this disclosure) can determine which of one or more returns corresponding to an emitted pulse of light are spurious. Generally speaking, there are multiple scenarios in which various obscurants or out-of-range targets produce spurious returns, i.e., returns that do not correspond to any targets of interest at the location indicated by the return. Additionally or alternatively, various paths of emitted light pulse may produce unwanted and/or misleading returns.

For example, an emitted pulse may be partially scattered by multiple solid objects when some of the objects do not fully subtend the instantaneous field of view (IFOV) of the light source. In some implementations, the system may treat all solid objects as targets of interest. In some cases, non-solid objects such as obscurants dispersed in the atmosphere may partially scatter the emitted pulse. As used herein, the term "obscurant" can refer to anything solid or non-solid that impedes the detection of a target of interest, or simply "target." An obscurant may only partially scatter light, allowing some light from the emitted pulse to penetrate through the obscurant. For example, there may be a solid target disposed behind an obscurant that scatters the remainder of the emitted pulse. In another scenario, the detected return may comprise only light scattered by one or more obscurants. In yet another scenario, a distant target disposed beyond the maximum range of the lidar system may scatter the emitted pulse that returns to the lidar system only after a subsequent pulse is emitted.

Figure 8A:
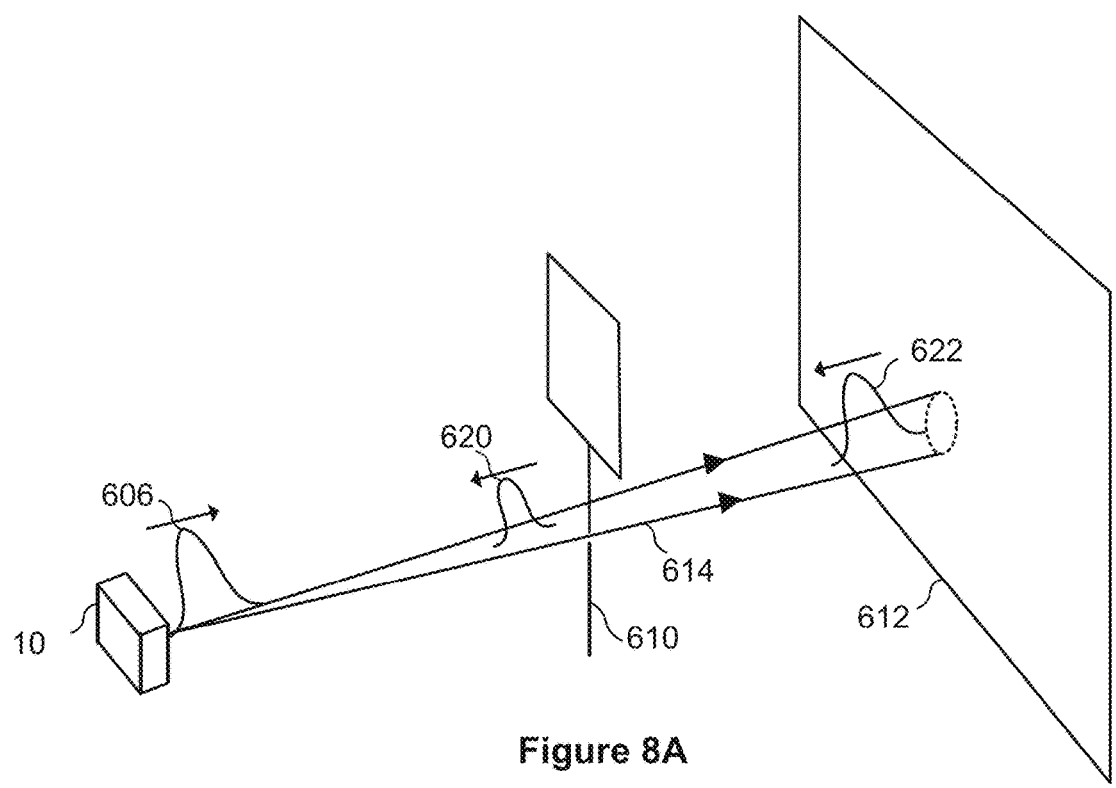
FIG. 8A illustrates an example scenario in which a machine vision system of FIG. 1 detects returns from two targets during the same ranging event.

Referring to FIG. 8A, a lidar system operating as part of the machine vision system 10 emits a pulse 606 that travels toward targets 610 and 612. FIG. 8A schematically illustrates the IFOV of the light source when the pulse 606 is emitted as a cone 614. In this example scenario, the cone 614 subtends the "small" target 610 and the "large" target 612 behind the small target 610. As used herein, a "small" target need not be small in absolute terms; rather, at a certain distance from the light source, the target occupies only a portion of the cross-section of the angular cone illuminated by the light source, so that the remaining portion of the cross-section can be projected onto a plane behind the small target. In the example of FIG. 8A, the small target 610 is the post of a road sign disposed relatively far from the machine vision system 10. This small target 610A partially scatters the emitted pulse, resulting in a return pulse 620. The large target 612 fully subtends the IFOV of the light source and scatters the remainder of the emitted light, resulting in another return pulse 622. The receiver of the lidar system detects the pulse 620 as well as the pulse 622.

Figure 8B:
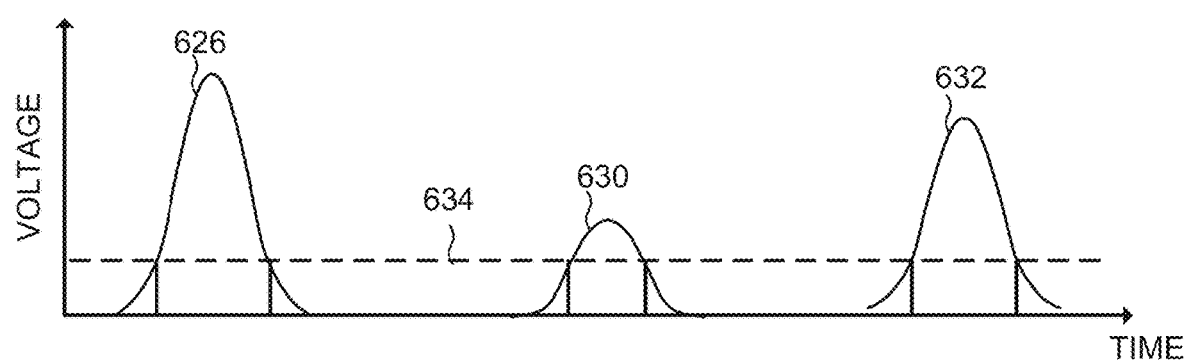
FIG. 8B is a timing diagram of an example voltage signal that can be generated in the scenario of FIG. 8A.

Next, FIG. 8B illustrates a voltage signal as a function of time corresponding to the pulses in FIG. 8A. The analog voltage signal illustrated in FIG. 8B may correspond to the output of block 510 or block 512 of pulse detection circuit illustrated in FIG. 7. A reference pulse signal 626 corresponds to the emitted pulse 606, for example, and may be generated by detecting a small fraction of the power of the emitted pulse 606 scattered by the window of the housing or diverted by other optical means toward the receiver. The delay of the reference pulse 626 may be considered negligible or, alternatively, the reference pulse 626 may be used to set the reference time for the voltage pulse signals 630 and 632, which correspond to the return pulses 620 and 622, respectively. A threshold voltage level 634 can be configured to be below the maximum voltage of each of the voltage pulse signals 626, 630, 632. In some implementations, a controller may vary the gain of the block 512 as a function of time to at least approximately equalize at least some of the voltage pulse signals.

Figure 8C:
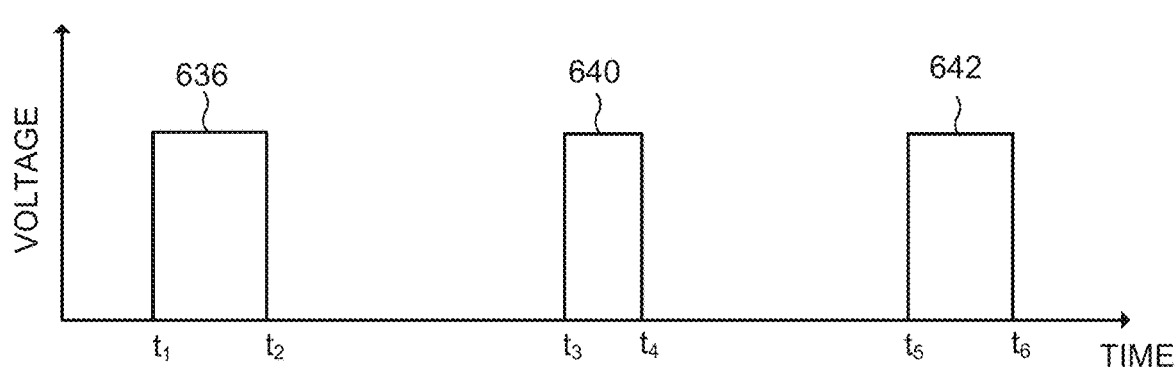
FIG. 8C is a timing diagram of an example digital voltage signal that can be generated in the scenario of FIG. 8A.

FIG. 8C illustrates a digital voltage output signal that corresponds to the voltage pulse signals 626, 630, 632 of FIG. 8B, generated by the block 514 of FIG. 7. The times $t_1$-$t_6$ the pulse-detection circuit can compute based on the output from the TDC 516 are marked on the time axis for clarity. Digital pulses signals 636, 640, 642 correspond to the voltage pulse signals 626, 630, 632, respectively. The widths of digital pulse signals output by the comparator 514 may indicate magnitudes of voltage pulse signals input into the comparator 514. In some implementations, only the times corresponding to rising edges of pulses, such as $t_1$, $t_3$, and $t_5$ may be detected by the receiver. In other implementations, only the times corresponding to falling edges of pulse signals, such as $t_2$, $t_4$, and $t_6$ may be detected by the receiver. In other implementations, the receiver may use multiple comparators with multiple thresholds and detect additional times corresponding to the rising and/or falling edges of pulse signals at different threshold levels. In general, a machine vision system can use multiple thresholds to process multiple times detected for a given return pulse to determine the shape of the pulse signal.

The machine vision system 10 can use the times $t_1$-$t_6$ to determine a delay for each of the return pulse signals of FIG. 8B. For example, the average of $t_1$ and $t_2$ may be used to determine a reference time, i.e. $t_0$=½ $(t_1+t_2)$. Then, the machine vision system 10 can calculate the distance to the proximal object 610 (see FIG. 8A) based on the time delay $t_p$=½ $(t_3+t_4)$-$t_0$, and calculate the distance to the distant object 612 based on the time delay $t_d$=½ $(t_5+t_6)$-$t_0$. In other cases, the time corresponding to the peak value of the returned pulse signal may be used.

More generally, a scene captured by the lidar system and the camera of the machine vision system 10 may contain multiple targets that partially scatter each emitted pulse. In some cases, there is a larger target within the maximum range of the lidar system, such as the larger target 612 in FIG. 8A, that scatters the remainder of the emitted light. In other cases, a larger target is outside of the maximum range of the lidar system, or there is no target within the maximum range to scatter a remainder of the emitted pulse. The scenario of FIG. 8A is similar to any scenario in which the emitted pulse of light is scattered by multiple solid targets, each generating a respective return. When two or more of these returns potentially may yield a range value to be assigned to a pixel, i.e., a lidar pixel value, the machine vision system 10 in one example implementation selects the most appropriate return for assignment to the lidar pixel in view of the data captured by the camera. In another implementation, the lidar system generates multiple points for the point cloud based on the multiple returns detected from a single emitted pulse. Thus, a single ranging event in different implementations and/or scenarios can yield no points, one point, or multiple points for a point cloud.

When selecting from among multiple returns, the machine vision system 10 in some cases selects the return from the nearest solid target, particularly when the machine vision system 10 determines that the nearest target represents an object of a relevant type the vehicle should track and/or avoid. Examples of this relevant type of objects include sign posts, light posts, or trees. In other situations, machine vision system 10 can be configured to ignore the nearest solid target if the object is determined to be an insect or a lightweight object such as a piece of cardboard, for example. When the small target 610 represents a scattering object of a relevant type disposed closer than the large target 612, the return 620 may be more significant than the return 622 from the large target 612. Further, a return corresponding to the nearest scattering object may be more significant than a return from a more extended background object because the extended background object may be well represented by the neighboring lidar pixels. The machine vision system 10 thus may select the return 620 rather than the return 622 to generate the lidar pixel value corresponding to the emitted pulse of light 606.

Alternatively, the system may report multiple returns corresponding to the same emitted pulse. In one such implementation, an array of ranges may be assigned to a given pixel (in other words, a single pixel can have multiple range or distance attributes). In another implementation, each of the multiple returns from solid targets may be used to generate a separate pixel or point in a three-dimensional point cloud.

For further clarity, the range-wrap problem, which may result in generation of an incorrect lidar pixel value, is briefly discussed with reference to FIGS. 9A-C. The machine vision system 10 is equipped with a lidar configured to have a maximum range of 200 m, according to this example implementation. The maximum range corresponds to the maximum round trip of 400 m and a corresponding delay of 1.33 µs for a pulse emitted by the lidar, scattered from a target and detected by the receiver of the lidar. The maximum range of 200 m allows the lidar system to emit pulses every 1.33 µs in order to maximize the angular resolution and speed of the system. FIG. 9A illustrates an example that does not produce a spurious response, where an object is located within the maximum range of 200 m. The lidar system receives the light scattered by the object approximately 1.1 µs after the pulse is emitted, which corresponds to the approximate distance of 160 m to the object. FIG. 9B illustrates a situation when the object is disposed beyond the maximum range of 200 m. The return pulse, as indicated by the return arrow, does not reach the lidar system at the expiration of the 1.33 µs interval, after which the next pulse is emitted. As FIG. 9C illustrates, before the next pulse (represented by a solid forward arrow) reaches the object, a return with the light from the previous pulse (the pulse illustrated as the return pulse in FIG. 9B) reaches the lidar system. The lidar system may interpret the return corresponding to the previous pulse as the return of the next pulse scattered by a nearer object or target, as illustrated in dashed lines. In this manner, a spurious return from an object 260 m away from the lidar system may appear to correspond to an object 60 m away from the lidar system.

A machine vision system of this disclosure can use camera input to discard spurious returns resulting from range wrap. In the example scenario of FIGS. 9A-C, the machine vision system can use camera input to determine that there is no object within the maximum range of lidar system and discard the return. Alternatively, instead of discarding the return, the machine vision system may determine that the detected return was from the previously-emitted pulse of light and calculate the distance based on the time from the previously-emitted pulse, effectively extending the maximum range of the lidar system. In the example scenario of FIGS. 9B-C, the camera data could indicate that although the lidar detected an object located 60 m away, no object is present in that range. As a result, the machine vision system could determine that the distance must be calculated from the previous pulse and identify a return at 260 m. Alternatively or additionally, the machine vision system may detect the presence of distant highly reflective objects such as road signs that may generate range-wrapped returns and signal the lidar system to eliminate these returns or calculate the range for these returns based on the timing of an earlier pulse.

As indicated above, atmospheric obscurants also can produce spurious returns. In particular, atmospheric obscurants can scatter part of a pulse of light emitted from a lidar system and/or attenuate the energy of the pulse of light on the way toward and from the target of interest. Such atmospheric obscurants may include rain, fog, haze, dust, steam, car exhaust, etc. Each type of an obscurant may create a different characteristic of a return pulse.

Figure 10A:
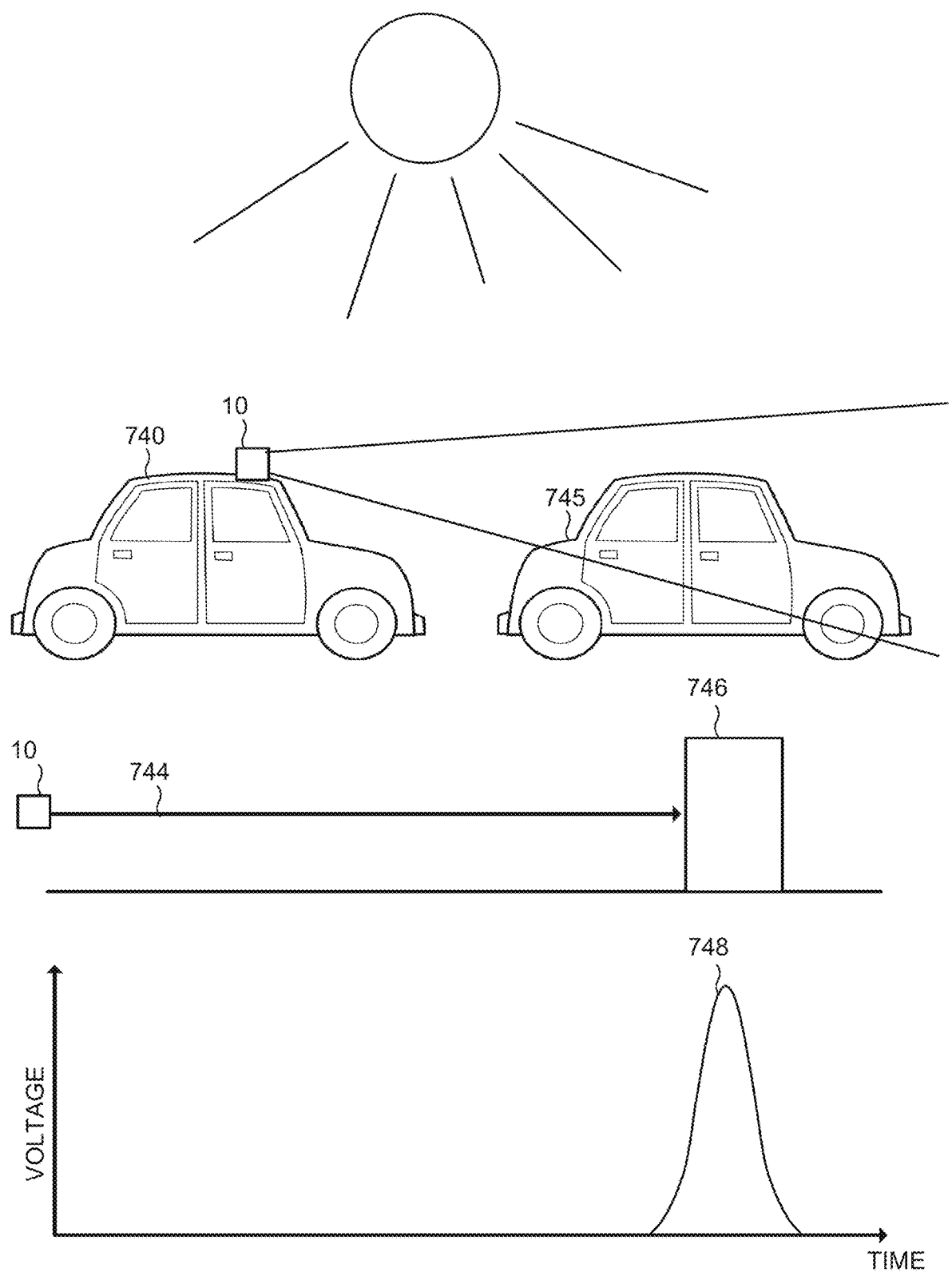
FIG. 10A illustrates an example scenario in which a machine vision system operating in a vehicle detects a target in the absence of obscurants.
Figure 10B:
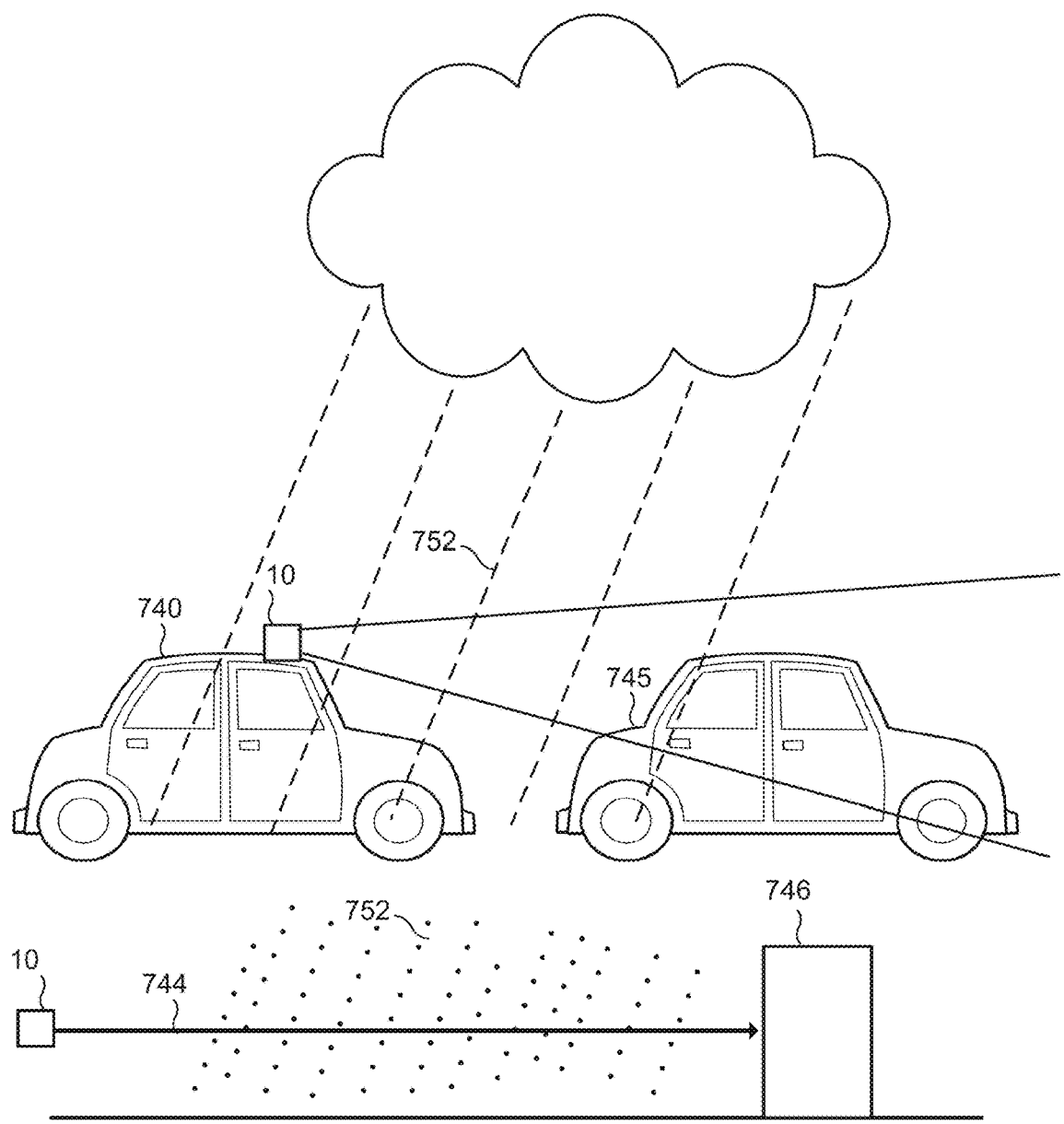
FIG. 10B illustrates an example scenario in which a machine vision system operating in a vehicle detects a target during rain.
Figure 10B:
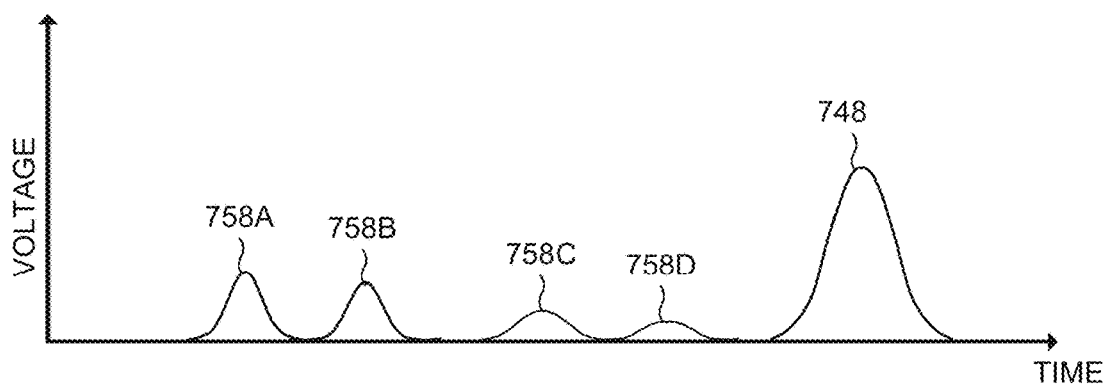
Figure 10C:
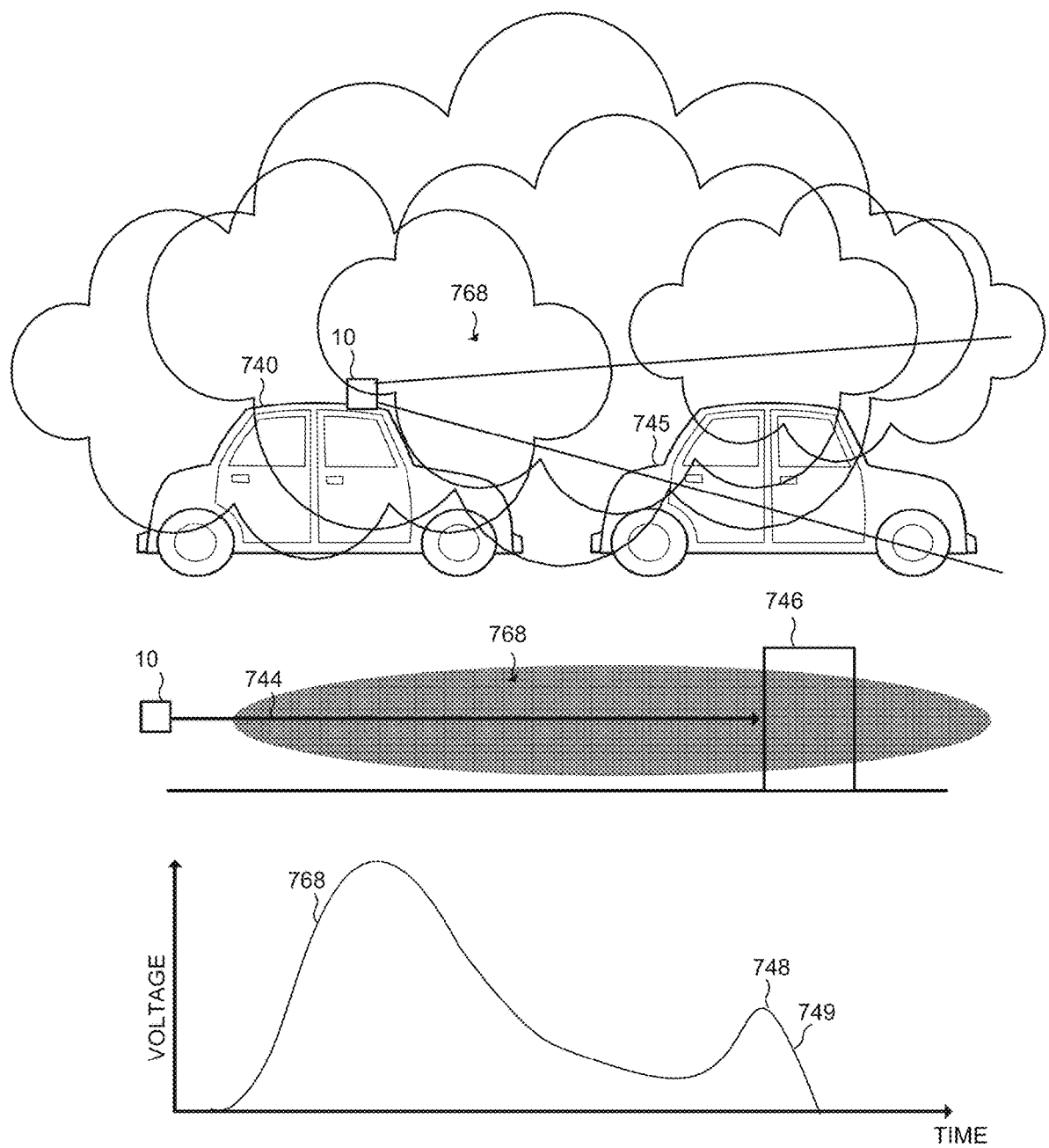
FIG. 10C illustrates an example scenario in which a machine vision system operating in a vehicle detects a target when a large amount of exhaust gas or fog is in the atmosphere.

FIG. 10A illustrates a situation where no obscurants are present, and FIGS. 10B and 10C illustrate situations where rain and fog, respectively, are present. In FIG. 10A, the machine vision system 10 mounted on a vehicle 740 has, within its FOR, a target in the form of another vehicle 745 and schematically represented by an object 746. A pulse of light with a certain IFOV has a direct and unobscured path to the target 746 in this example. The return pulse scattered by the object 746 can be detected as a return by the receiver that will produce a corresponding voltage pulse 748 with a delay representative of the distance of the object 746 from the machine vision system 10.

In the scenario of FIG. 10B, rain 752 is the obscurant in the path 744 of the emitted pulse, resulting in multiple returns as light is scattered from drops of rain. The detected returns may result in discrete voltage pulses 758A-D that may decrease in amplitude at least in part in correspondence to increased delay time due to divergence of light as well as power loss due to scattering. The machine vision system 10 may discard the returns 758A-D on the basis of one or more factors. One factor may include imagery captured by the camera, and another factor may include the characteristics of the pulses, such as magnitude or shape of the return.

FIG. 10C illustrates a scenario generally similar to the one illustrated in FIG. 10B, but the obscurant in this scenario is fog. The fine droplets of the fog may attenuate the emitted pulse of light and scatter much of the light. The receiver of the lidar system may detect some of the scattered light as an extended return pulse 768. The shape of the return pulse 768 may correspond to a large quantity of evenly distributed rain droplets that result in overlapping pulses merged into one. Similar returns may be generated by exhaust, fine dust, or haze. The energy of the return from the target comprising a solid object may result in the return pulse 748 superimposed on the extended spurious return 768 from the obscurant. The solid object may scatter the remaining emitted light and result in a falling edge 749 indicative of the solid object. The lidar system may have time-varying gain to address the effect of a scattering obscurant, when a machine vision system comprising the lidar detects the presence of the obscurant. The detection of the obscurant in this manner may be complemented by other information that the vision system can obtain from a camera.

Further, other scenarios may result in unwanted or spurious detections. For example, a lidar system, e.g. such as one with multiple sensor heads, may emit multiple pulses that are intended for multiple corresponding detectors. A pulse that is intended for one detector may generate a return from another detector. Such a situation may be described as cross-talk. When a pulse from a lidar system disposed on a different vehicle generates an unwanted return in a lidar system, the situation may be described as interference. Both cross-talk and interference may generate spurious returns that don't correspond to targets within the FOV of the lidar system.

Reflective, especially highly specularly reflective, surfaces may generate another class of spurious returns. Road puddles, other surface of water, windows, or other reflective surfaces may redirect light to and from targets and generate returns at a wrong distance. In some cases, the specularly reflective surfaces may not scatter the pulse in the direction of the lidar detector. Atmospheric refractions may also generate returns similar to specular reflectors in an optical phenomenon known as a mirage. In general, the spurious responses from redirected pulses may be referred to as multipath responses.

Figure 11A:
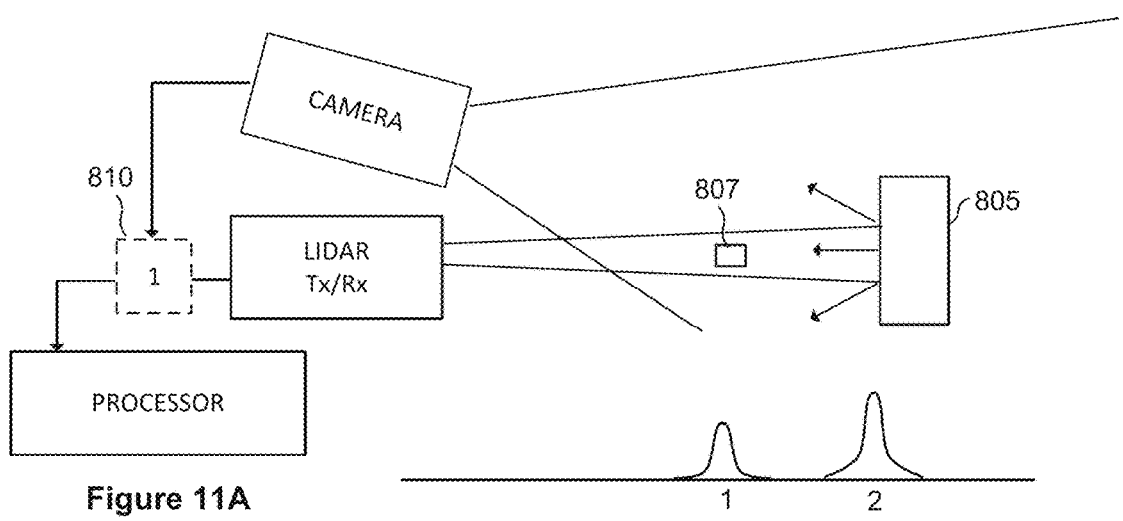
FIGS. 11A-C illustrate a machine vision system in which a lidar system selects one of several returns in view of camera input.
Figure 11B:
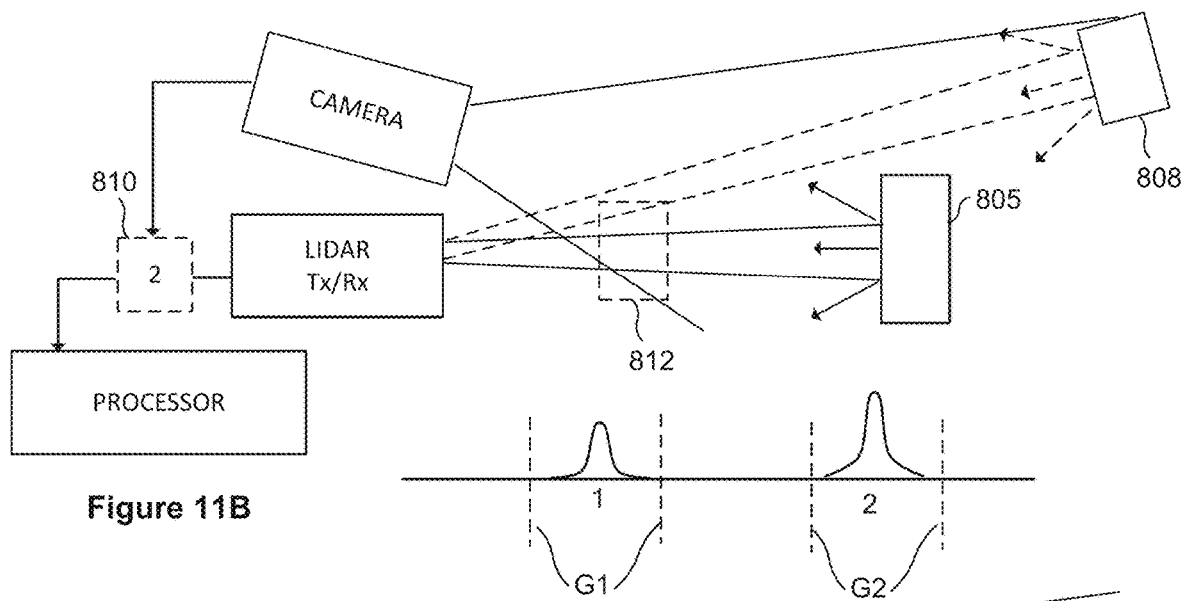
Figure 11C:
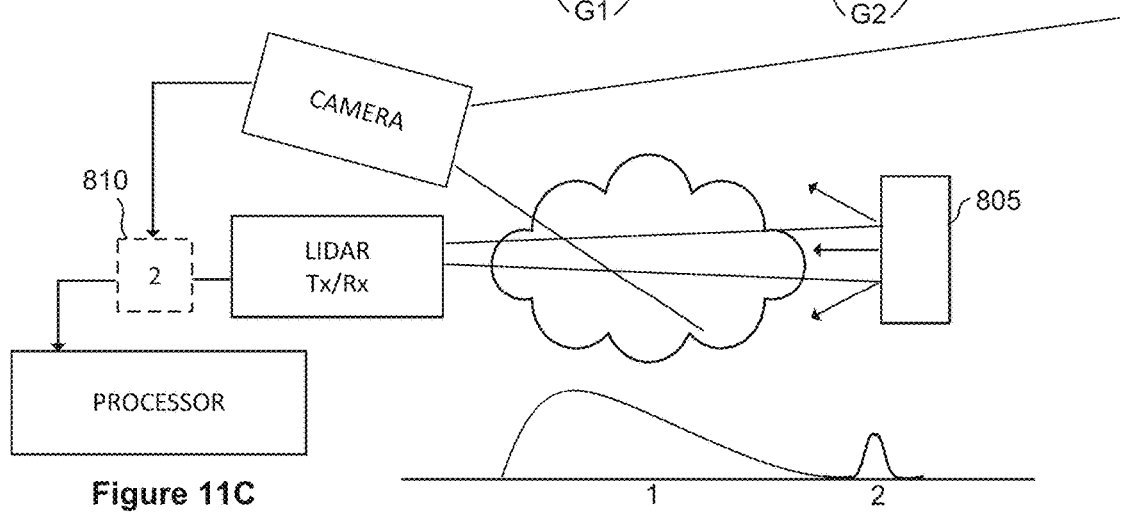

Next, FIGS. 11A-C schematically illustrate operation of a machine vision system equipped with a camera and a lidar system. The machine vision system of FIGS. 16A-C can be similar to the machine vision system 10 discussed above. Generally speaking, the machine vision system can select one or more of the detected returns corresponding to an emitted pulse of light or, alternatively, a default value using one or more images generated by the camera. The default value may be the value that corresponds to a lack of a return within a certain time period, such as the inverse of the pulse rate of the lidar system. The default value may indicate that there are no targets of interest within the IFOV and within the maximum range of the lidar system. Alternatively, when no pulses are detected, the lidar system may omit generating a pixel value or a point for the point cloud.

In each of the FIGS. 11A-C, an object 805 disposed within the maximum range of the lidar system scatters the light emitted by the lidar system, generating one of the returns detected by the lidar system. The return due to the scattering by the object 805 is the second return 2 illustrated on the corresponding timelines. As further illustrated in FIGS. 11A-C, the camera of the machine vision has a FOR such that the object 805 is within the FOR of the camera. Still further, receiver of the lidar system in each of the three scenarios detects another, earlier return 1.

In the scenario of FIG. 11A, an object 807 is a proximate object that may be analogous to the small target 610 of FIG. 8A, while the object 805 is a distant object. In FIG. 16B, the earlier return 1 is produced due to range wrap described in FIGS. 8A-C. A reflection from a highly reflective object 808 in the path of the emitted pulse of light at the previous position of the scan forms the early detected return 1. In FIG. 16C, the early return 1 is produced in response to an obscurant such as fog or a cloud of dust or exhaust.

The camera illustrated in each of FIGS. 11A-C provides data that allows the lidar system to make an accurate selection of the desired return. The selection block is schematically illustrated as a gate 810 that receives input from the camera and uses this input to select between the early return 1 and the later return 2. Gate 810 is shown to be independent from the processor in FIGS. 11A-C, but can be implemented as part of the processor in the machine vision system. In various scenarios, the machine vision system can select both return 1 and return 2, can select one of the two returns, or can select neither. In FIG. 11A, for example, the camera may detect the presence of the proximal object 807 and the distant object 805. The camera in general can determine that there is a proximate object in front of a distant object, and that the proximate object is at a certain approximate distance from the lidar system. The camera can generate information about segmented images and/or classified objects and their approximate distance, and provide this information to the lidar system or machine vision system in any suitable format. The lidar system or machine vision system then can check whether the data from the camera indicates that there is an object corresponding to the earlier return 1. Alternatively, the lidar system or the machine vision system may calculate, based on geometry and the timing within a lidar scan, the pixels of the camera image that may correspond to the return of the lidar pulse and check for a presence of objects.

Additionally or alternatively, the machine vision system can check the extent of a null-space identified, detected, delineated, or demarcated within the FOR of the camera. The null-space can be defined as a volume above ground that is free, empty, or devoid of obstacles, targets, or other solid objects. It may be viewed as the absence of detected objects within a certain range and/or a portion of the FOR of the camera, where the FOR of the camera includes the path of the emitted lidar pulse. Thus, for example, if an early return comes from an area that is within the null-space detected by the camera, the early return may be eliminated, while if a return comes from an area that is not within the null space, it may result in generating a pixel value. The null space range may be configured in different embodiments according to the needs of the system. For example, in some embodiments the null space range may indicate the absence of detected objects within the maximum range of the lidar system. In other embodiments, the null space range may indicate the absence of detected objects within some range smaller than the maximum range of the lidar system. In yet other embodiments, the null space range may indicate the absence of detected objects in some window of range, such as between 50 meters and 100 meters from the lidar system.

In the scenario illustrated in FIG. 11B, the return with the smaller delay in the example may correspond to a virtual object 812, corresponding to the range-wrapped early return 1, within the null-space detected by the camera. If the imagery collected by the camera provides no evidence of the object 812 actually being present, the lidar system or the machine vision system can discard the range-wrapped early return 1 and select the later return 2 when generating a lidar pixel value. Additionally or alternatively, the camera may detect the highly reflective object 808 at a distance greater than the maximum range of the lidar system, in the path of the emitted pulse of light. Thus, the lidar system or machine vision system can discard the early return based on (i) the detection of the reflective object 808 at a distance beyond the maximum range, (ii) the determination that the object 812 is within the null-space and accordingly does not exist, or both. As an alternative to discarding the early return, the lidar system or machine vision system may recognize that the return may be a result of range wrap and may calculate the location of the object corresponding to the return based on the timing of a previously emitted pulse.

The lidar system or machine vision system in some cases discards multiple returns that originate from within the null-space determined from one or more images generated by a camera. Thus, one or more processors of the vision system may detect absence of targets along the path of an emitted lidar pulse using one or more images generated by a camera. On this basis, the lidar system or machine vision system can discard the detected returns that correspond to points within the null-space. If the detected absence of targets or a null-space extends beyond the maximum range of the lidar system, all of the detected returns may be discarded. Alternatively, the lidar system can assign a default value to the lidar pixel. This default value may be the same as the value assigned to a pixel when there are no detected returns between pulse emissions or within another pre-determined time period corresponding to the maximum range of the lidar system.

In another implementation, the processor of the machine vision system can use one or more images from the camera to generate information regarding approximate distances of objects, including those within the range and FOR of the lidar system. The controller may compute the interval of range-wrapped times and use it as a time gate G1 within which the lidar return may be rejected. On the other hand, the controller may generate another time gate G2 within which the vision system may expect a lidar return from the target of interest 805, providing additional information for identifying the target 805. In general, information from the camera and/or the corresponding controller may include segmented areas and/or classified objects as well as corresponding approximate distances. Such distances may serve as time gates for selecting lidar returns.

The camera or the processor of the machine vision system may, in some implementations, determine approximate distances to a set of relevant targets. The selection of returns for generating pixels then may be performed in view of the approximate distances. For example, if the lidar system generates a return that corresponds to a distance that is not within the tolerance threshold of an approximate distance determined from the camera data, the return may be discarded. In some implementations, confidence tags may be used to select among returns or to resolve conflicts in data from the camera and from the lidar system.

FIG. 11C illustrates how the machine vision system rejects spurious returns due to atmospheric obscurants. A processor connected to or integrated with a camera may analyze the images generated by the camera and detect the presence of an obscurant. Further image analysis may determine the type of obscurant in the path of an emitted pulse. For example, the camera may detect the presence of one or more of rain, snow, hale, sleet, dust, exhaust, haze, fog, smog, steam, or another atmospheric obscurant. The camera can provide corresponding indications to the lidar system to facilitate a selection of one or more returns or the default value, or alternatively omit generating a pixel for a given direction.

In addition to selecting a return for assigning a value to a lidar pixel, the lidar system can adjust one or more operational parameters in view of the data received from the camera. For example, when the machine vision system detects an obscurant and, some cases, identifies the type of the obscurant, the lidar system can adjust the gain of the detector or the gain profile as a function of time to better equalize the returns from different ranges. The lidar system also can modify the scan pattern, adjust the pulse energy, adjust the repetition rate, etc. For example, an obscurant may limit the maximum range, and the lidar system accordingly can select a lower or higher pulse repetition rate in response to the detection of an obscurant. The higher pulse repetition may be used in conjunction with reducing the range of the lidar system. For example, a lidar system immersed in fog may interrogate the FOR with more frequency to obtain as much information as possible from the targets with the reduced range.

Further, during selection of an appropriate return in the scenario of FIG. 11C, the lidar system can derive additional information from the shapes of pulses, such as the obscurant return 1 and the target return 2. The lidar system can obtain information about shapes of returns by using variable comparator threshold, banks of comparators, variable gain, analog-to-digital converters, and/or other techniques. The machine vision system can combine the information related to the shapes of pulses with the data from the camera in order to more accurately identify obscurants. In the scenario illustrated in FIG. 11C, for example, the obscurant may be identified as fog, and the corresponding return 1 may be discarded, while the lidar system can interpret the more delayed return 2 as an indication of a target of interest and use return 2 to generate a pixel value.

In some scenarios, the return from a solid target of interest may be superimposed on a return from the obscurant, which may be larger in magnitude than the target return. However, the solid target of interest behind an obscurant may fully obstruct the remainder of the transmitted pulse, resulting in a falling edge that is indicative of the target position. Thus, the indication from a camera than an obscurant is present may lead the lidar system to discard all returns before the last one and/or use the falling edge of the extended return as an indication of the position of a target within the maximum range.

A camera also may help identify returns that do not come from targets in the direct line-of-sight (LOS) of the emitted pulse. As discussed above, this can be the case with the multi-path phenomenon. For example, a camera system may identify a flat surface of a truck in the view of the lidar system, while the lidar system may detect multipath returns that appear to originate from beyond the surface of the truck. Such spurious returns may be eliminated. Alternatively, in some implementations, if the angle of the specularly-reflecting surface may be recalculated, the multipath returns may generate information that is nominally outside of the FOR of the lidar system.

Additionally or alternatively, data from a camera may help eliminate cross-talk and interference returns. Cross-talk and interference may suggest a presence of targets in the null-space of the camera. Such returns may be eliminated based on input from the camera.

In some scenarios, the data the machine vision system generates based on the images captured by the camera contradicts the data the lidar system generates. For example, a lidar return may indicate that there is a target at a certain range, while the camera data may indicate that there is no target. As another example, the shapes of returns may indicate the presence of atmospheric obscurants, while the camera does not detect such obscurants. To address the contradiction, the machine vision system in some implementations assigns confidence tags to frames, regions within scan frames, or even individual pixels. The confidence tags may be used as metrics of uncertainty associated with the data. For example, a tag can be an estimate of the probability that the target is detected correctly. A confidence tag may also be associated with a particular range: the lidar system can report, for example, that targets at distances between zero and five meters are detected with the confidence level $L_1$, targets at distances between five and 25 meters are detected with the confidence level $L_2$, etc. In terms of the camera, a confidence tag may be associated with each image pixel or, for example, with an extended null space. In the latter case, a null space may be defined as a set of probabilities that there are no targets at different locations. In such cases, the lidar system can make the decision when selecting a return from among multiple returns and a default value in view of the confidence tags assigned by the camera or to the data collected by the camera.

When the lidar system assigns confidence tags to lidar pixels, the lidar system can consider the shapes of pulses (e.g., an excessive spread in time may yield a lower confidence metric, and a lower peak voltage of the pulse signal may yield a lower confidence metric), the presence of multiple returns, the degree of agreement between camera data and lidar data, etc.

Figure 12:
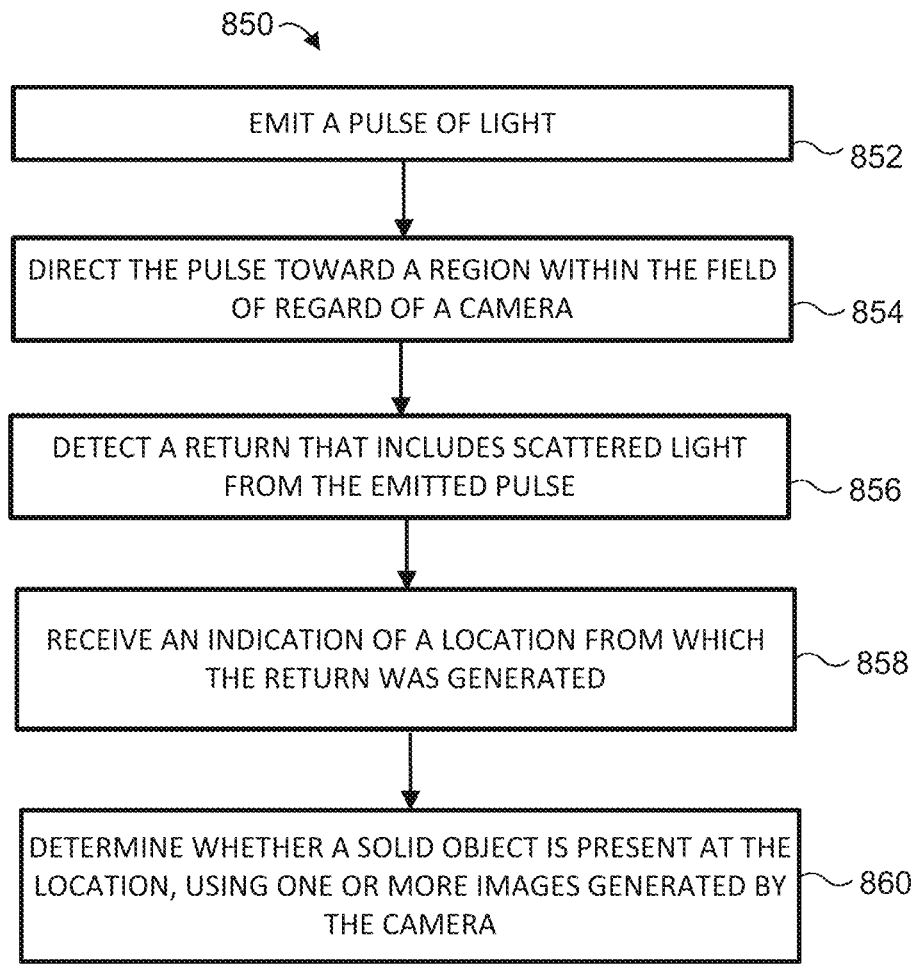
FIG. 12 is a flow diagram of an example method in a lidar system for determining whether a solid object is present at a location from which light emitted by a laser is scattered, which can be implemented in a machine vision system of this disclosure.

FIG. 12 illustrates a method 850 for operating a machine vision system that can be implemented in the lidar system 100 or 200, for example, or in a processor located elsewhere in the machine vision system 10. At block 852, a pulse is emitted. Next, at block 854, the pulse of light is directed toward a region within the field of regard of a camera. A return that includes scattered light from the emitted pulse is received at block 856. An indication of a location from which the return was generated is received at block 858. In some cases, multiple indications of locations can be based on the return light. At block 860, one or more images generates by a camera are used to determine whether a solid object is present at the location indicated at block 858. In this manner, imagery collected using a camera in some cases indicates that light contained in a return corresponding to a certain location was not in fact scattered by a solid object, and in other cases confirms that the return corresponding to a certain location includes light scattered by a solid object.

Figure 13:
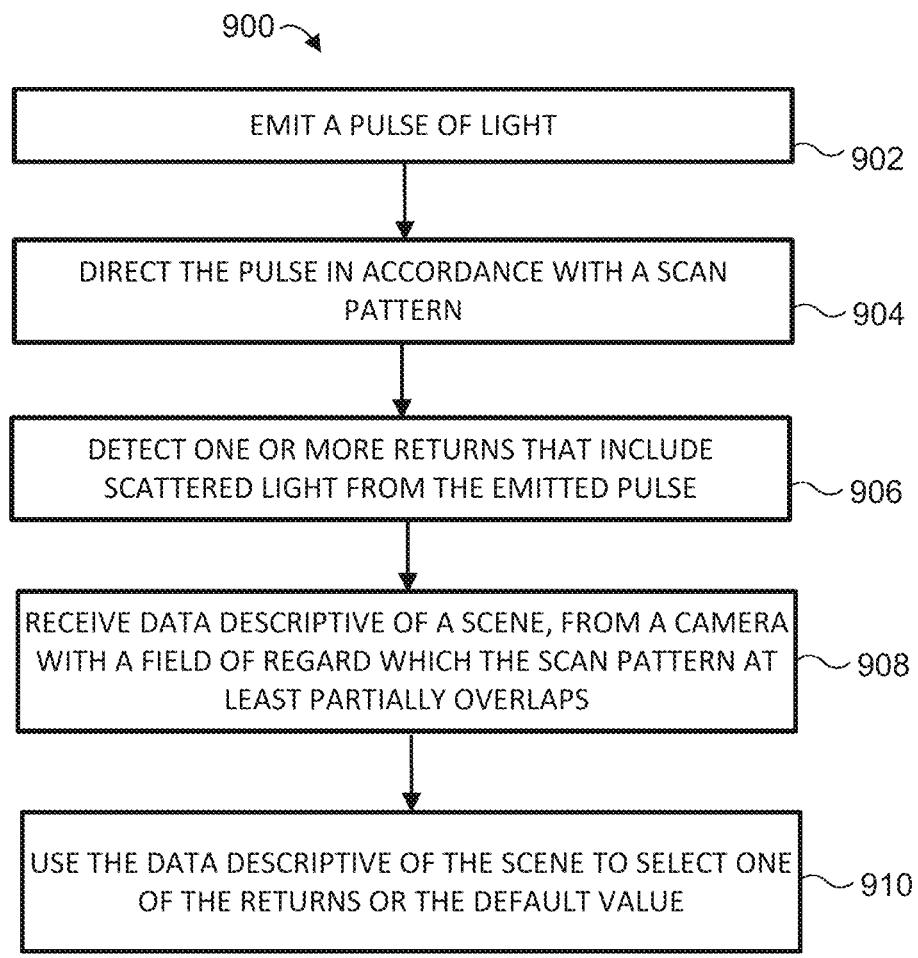
FIG. 13 is a flow diagram of an example method in a lidar system for generating lidar pixels, which can be implemented in a machine vision system of this disclosure.

Referring to FIG. 13, a method 900 for refining lidar return data can be implemented in, for example, the lidar system 100 or 200, or in a processor located elsewhere in the machine vision system 10. The method begins at block 902, when the lidar system emits a pulse of light. In this embodiment, the pulse is directed to a certain point within the FOR of the lidar system in accordance with the scan pattern, at block 904, although other embodiments may utilize non-scanning (e.g. flash) lidar. Next, at block 906, scattered light returned from the emitted pulse of light is detected by the receiver. The scattered light returned to the receiver may take a variety of forms, such as the series of discrete pulses illustrated in FIG. 10B or the more extended return pulse illustrated in FIG. 10C.

At block 908, a processor receives an indication of a location of an object based on the returned light. In one embodiment, the indication may be a pixel having a distance value and two angular values that represent the location of the pixel with respect to the lidar system. In another embodiment, the indication may be timing information corresponding to the returns detected by the lidar system as illustrated by times $t_1$-$t_6$ in FIG. 8C. The indication may correspond to, for example, the emitted light scattering off a solid object (either directly or via specular reflection or multi-path) or an obscurant, or it may correspond to a range wrap event or a false-positive detection generated due to noise in the system. In addition to timing information, the processor may receive additional information about the returned light, such as the magnitude or pulse width of the return.

The processor receives the camera image data describing the scene that the lidar system at least partially overlaps at block 910. Depending on the implementation of the interface between the lidar system and the camera, the data can include "raw" images, indicators of objects identified within a scene, approximate distances to these objects, indicators of various atmospheric obscurants, the dimensions of one or more null-spaces, etc. In some embodiments, the camera maintains an occupancy grid that tracks the location of objects in the scene.

The processor may detect, for example, solid objects, obscurants, and empty space based on the camera image data. In some embodiments, the camera passes raw data to the processor, and the processor classifies the scene to detect the solid objects, obscurants, empty space, etc. In other embodiments, the camera processes its own data to describe the scene and passes the information to the processor. In some embodiments, the camera maintains an occupancy grid that tracks the location of objects in the scene, and the processor may query the camera based on the expected location of the objects to determine whether the camera detects, for example, solid objects, obscurants, or nothing corresponding to that location. Further, to ensure that data from a camera is relevant for identifying lidar returns corresponding to solid objects, the lidar system may obtain timing information associated with the camera data at block 908. Defining time T0 as the time when a lidar pulse is emitted, the relevant data from the camera for selecting a return from that pulse may have the origin time between T0+$T_R$ and T0, where $T_R$ is a relevance time interval. $T_R$ may depend on the type of data with which $T_R$ is associated as well as the scenarios in which $T_R$ is used. For example, $T_R$ for null space may be 0.005, 0.01, 0.02, 0.05, 0.1, 0.2, 0.5 or some other similar fraction of a second, while the $T_R$ for detecting rain or fog may be many seconds long. $T_R$ may depend on the exposure frequency of the camera, which can range from fractions of a MHz to Hz. $T_R$ also may depend on the speed of the vehicle, on the speed of objects tracked by the camera, on predictive filters or algorithms used or on other factors. Additionally or alternatively, rather than having an abrupt expiration of camera data, the system may attach a confidence tag to camera data that varies as the camera data ages (or for other reasons). In this discussion, it is assumed that the lidar system and the camera have a common or a synchronized time reference.

At block 912, the processor determines whether a solid object is present at one or more of the locations indicated by the lidar system. The processor may make this determination by checking the camera image data relevant to the location. For example, if the camera image data confirms that a solid object is present at the location, then the processor may retain that indication of location.

If the camera image data shows that a solid object is not present at the location, then the processor may discard that indication of location by, for example, deleting the indication, flagging the indication as corresponding to something that does not need to be avoided by the vehicle or something other than a solid object, flagging the indication as corresponding to a low confidence level that the indication is accurate, or not passing the indication to the point cloud. The processor may consider additional characteristics of the indication, such as the magnitude or shape of the returned pulse, when determining whether to discard or ignore that indication of location. For example, if the magnitude of the returned pulse is above a certain threshold, the processor may conclude that the camera image data is not correctly capturing an object and may retain the indication of location.

In another example, the processor may use camera image data to detect range wrap events generated by the lidar system and correct for the range wrap events. If the camera image data shows that a solid object is not present at the location, but that a solid object is present along the IFOV of the light source from the previously-emitted (i.e. not most recently emitted) light pulse at a range beyond the maximum range of the lidar system, the processor may discard or ignore the indication of location. As an alternative, the processor may correct the indication of location by calculating the range based on the timing from a previously emitted light pulse rather than the most recently emitted light pulse and may retain the corrected location for use in the point cloud.

As another example, if the camera image data shows that there is an obscurant in the line-of-sight between the lidar system and the location, the processor may consider the type of obscurant that is present when determining whether a solid object is present at the location. For example, where the camera image data shows rain between the lidar system and the camera image data further shows a solid object, the processor may discard or ignore indications of location that do not correspond to the location of the solid object. In another implementation in which the camera image data shows rain, the processor may discard or ignore all indications of location with the exception of the last return corresponding to an emitted pulse of light.

As another example of an obscurant, the camera image data may show fog in the line-of-sight between the lidar system and the location. In this case, the processor may receive an indication of location that, for example, reflects an extended return pulse such as that shown in FIG. 10C, or it may receive multiple pixels corresponding to the two peaks of the return pulse. The processor may discard or ignore indications of location with the exception of the last return corresponding to the emitted pulse of light. The processor may take the same approach in cases in which the obscurant is vehicle exhaust, although the extended return pulse in that case may be substantially shorter.

In some embodiments, if the camera image data shows that a solid object is not present at the indicated location then the processor may conclude that the return corresponded to a false-positive detection. The processor may keep a count of false-positive detections captured by the lidar system and, if the number of detections exceeds an acceptable number, then the processor may instruct the lidar system to modify one or more threshold values that the comparator 514 of the pulse-detection circuit uses to detect scattered light.

Where the processor discards or ignores an indication of location, that location will not be used in the point cloud to identify or detect objects. Where the processor retains the indication of location, that location will be used in the point cloud. In cases in which the indication of location is a pixel, the pixel may be passed through to the point cloud. In cases in which the indication of location is timing information, the processor may generate a pixel and pass that pixel to the point cloud. In cases in which the processor corrects for range wrap, in one embodiment, the processor may generate a new pixel by creating a new pixel, modifying an existing pixel, or modifying existing timing information, by using the timing of a previously emitted light pulse to determine the range.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A machine vision system comprising:
    a camera configured to generate one or more images of a field of regard (FOR) of the camera;
    a lidar system including:
        a laser configured to emit light, wherein the lidar system directs the emitted light toward a region within the FOR of the camera, and
        a receiver configured to detect light returned from the emitted light; and
    a processor configured to:
        receive an indication of a location based on the returned light,
        determine whether a solid object is present at the location based on the one or more images by detecting an absence of targets along a path of the emitted light within a maximum range of the lidar system, using the one or more images, and
        discard the indication of the location based on the detection of the absence of targets.

2. The machine vision system of claim 1, wherein:
    the indication of the location is one of a plurality of indications of location received by the processor, wherein the indications of location are based on the returned light; and
    the processor is further configured to:
        detect an obscurant in a path of the emitted light, using the one or more images generated by the camera.

3. The machine vision system of claim 2, wherein the obscurant includes one of rain, fog, haze, dust, steam, or car exhaust.

4. The machine vision system of claim 2, wherein the processor is further configured to:
    discard all but a last one of the indications of location in response to detecting the obscurant; and
    associate the last one of the indications of location with the solid object.

5. The machine vision system of claim 1, wherein the emitted light is an emitted pulse of light, and wherein the processor is further configured to:
    detect a shape of a pulse corresponding to the indication of the location,
    classify the pulse based on whether the shape corresponds to a result of scattering by (i) rain or (ii) one of fog, haze, or dust, and
    discard the indication of the location as a result of the classification along with the one or more images generated by the camera.

6. The machine vision system of claim 5, wherein the processor is further configured to:
    determine that the returned light comprises an extended return, shaped as a pulse extended over a period of time greater than a threshold value,
    detect a likely target return, shaped as a short pulse superimposed on the extended return, and
    in response to detecting the likely target return, select the likely target return to generate a lidar pixel value.

7. The machine vision system of claim 1, wherein the indication of the location is a pixel comprising distance information.

8. The machine vision system of claim 1, wherein the emitted light is an emitted pulse of light, and wherein the indication of the location is one of a plurality of indications of location received by the processor, each of the indications of location based on a respective pulse of returned light; and
    wherein the processor is further configured to:
        determine a type of the solid object,
        determine, based on the determined type, an expected shape of a pulse of returned light, and
        select, from among the pulses of returned light, a pulse with a shape most proximate to the expected shape to generate a lidar pixel value.

9. The machine vision system of claim 1, wherein the emitted light is an emitted pulse of light, and wherein the indication of the location is one of a plurality of indications of location received by the processor, each of the indications of location based on a respective pulse of returned light; and
    wherein the processor is further configured to:
        detect an approximate distance to the solid object using the one or more images generated by the camera, and
        select, from among the pulses of returned light, a pulse based on the detected approximate distance to generate a lidar pixel value.

10. A method for operating a machine vision system, the method comprising:
    receiving, from a camera, data descriptive of a scene within a field of regard (FOR) of the camera;
    emitting, by a laser operating in a lidar system, light;

directing the emitted light toward a region within the FOR of the camera;
detecting light returned from the emitted light;
receiving an indication of a location based on the returned light;
determining, by a processor, whether a solid object is present at the location, based on the data descriptive of the scene, including detecting an object in a path of the emitted light, at an approximate distance greater than a maximum range of the lidar system, using the data descriptive of the scene, wherein the object scatters the light corresponding to the indication of the location; and
discarding the indication of the location in view of the object.

11. The method of claim 10, further comprising:
receiving a plurality of indications of location, wherein each of the indications of location is based on the returned light; and
detecting an obscurant in a path of the emitted light, using the data descriptive of the scene.

12. The method of claim 10, further comprising:
receiving a plurality of indications of location, wherein each of the indications of location is based on the returned light;
estimating, using the data descriptive of the scene, a set of approximate distances to a set of targets; and
selecting the indications of locations that correspond to a set of the approximate distances to generate one or more lidar pixel values.

13. The method of claim 10, further comprising:
receiving a plurality of indications of location, each of the indications of location based on a respective pulse of returned light;
for each of the pulses of returned light:
 determining a shape of the pulse; and
 determining whether the determine shape corresponds to a result of scattering by (i) rain or (ii) one of fog, haze, or dust, to generate pulse classification, and
selecting one or more of the indications of location, using the generated pulse classifications along with the data descriptive of the scene received from the camera, to generate one or more lidar pixel values.

14. A machine vision system comprising:
a camera configured to generate one or more images of a field of regard (FOR) of the camera;
a lidar system including:
 a laser configured to emit light, wherein the lidar system directs the emitted light toward a region within the FOR of the camera, and
 a receiver configured to detect light returned from the emitted light; and
a processor configured to:
 receive an indication of a location based on the returned light,
 determine whether a solid object is present at the location based on the one or more images by detecting an absence of targets along a path of the emitted light within a certain range of the lidar system, using the one or more images;
 detect an object in a path of the emitted light, at a distance greater than a maximum range of the lidar system, using the one or more images, and
 discard the location in response to detecting the absence of targets within the certain range and detecting the object at a distance greater than the maximum range.

15. A machine vision system comprising:
a camera configured to generate one or more images of a field of regard (FOR) of the camera;
a lidar system including:
 a laser configured to emit light, wherein the lidar system directs the emitted light toward a region within the FOR of the camera, and
 a receiver configured to detect light returned from the emitted light; and
a processor configured to:
 receive an indication of a location based on the returned light,
 determine whether a solid object is present at the location based on the one or more images by detecting an absence of targets along a path of the emitted light within a certain range of the lidar system, using the one or more images,
 detect an object in a path of the emitted light, at a distance greater than a maximum range of the lidar system, using the one or more images, and
 generate a pixel that corresponds to the range of the object in response to detecting the absence of targets within the certain range and detecting the object at a distance greater than the maximum range.

16. A machine vision system comprising:
a camera configured to generate one or more images of a field of regard (FOR) of the camera;
a lidar system including:
 a laser configured to emit a pulse of light, wherein the lidar system directs the emitted light toward a region within the FOR of the camera, and
 a receiver configured to detect light returned from the emitted light; and
a processor configured to:
 receive an indication of a location based on the returned light, wherein the indication of the location is one of a plurality of indications of location received by the processor, and each of the indications of location is based on a respective pulse of returned light,
 select, from among the pulses of returned light, a pulse to generate a lidar pixel value,
 assign a confidence tag to the generated lidar pixel value in view of a shape of the selected pulse, and
 determine whether a solid object is present at the location based on the one or more images.

17. A method for operating a machine vision system, the method comprising:
receiving, from a camera, data descriptive of a scene within a field of regard (FOR) of the camera;
emitting, by a laser operating in a lidar system, light;
directing the emitted light toward a region within the FOR of the camera;
detecting light returned from the emitted light;
receiving an indication of a location based on the returned light;
determining, by a processor, whether a solid object is present at the location, based on the data descriptive of the scene, including detecting an object in a path of the emitted light, at an approximate distance greater than a maximum range of the lidar system, using the data descriptive of the scene, wherein the object scatters the light corresponding to the indication of the location; and
generating a pixel that corresponds to the range of the object in response to detecting the object at a distance greater than the maximum range.

18. A method for operating a machine vision system, the method comprising:
- receiving, from a camera, data descriptive of a scene within a field of regard (FOR) of the camera;
- emitting, by a laser operating in a lidar system, light;
- directing the emitted light toward a region within the FOR of the camera;
- detecting light returned from the emitted light;
- receiving an indication of a location based on the returned light;
- detecting, using the data descriptive of the scene, a presence of a specularly reflective surface in the path of the light;
- determining, by a processor, whether a solid object is present at the location, based on the data descriptive of the scene; and
- discarding the indication of the location in view of a multipath return due to the specularly reflective surface.

* * * * *